(12) United States Patent
Ishidera et al.

(10) Patent No.: US 9,075,454 B2
(45) Date of Patent: Jul. 7, 2015

(54) ELECTRONIC APPARATUS, CONTROL PROGRAM, AND CONTROL METHOD

(71) Applicant: FUJITSU LIMITED, Kawasaki-shi, Kanagawa (JP)

(72) Inventors: Nobutaka Ishidera, Inagi (JP); Mutsumi Ohkusa, Sumida (JP)

(73) Assignee: FUJITSU LIMITED, Kawasaki (JP)

( * ) Notice: Subject to any disclaimer, the term of this patent is extended or adjusted under 35 U.S.C. 154(b) by 123 days.

(21) Appl. No.: 13/711,708

(22) Filed: Dec. 12, 2012

(65) Prior Publication Data

US 2013/0120256 A1    May 16, 2013

Related U.S. Application Data

(63) Continuation of application No. PCT/JP2010/061417, filed on Jul. 5, 2010.

(51) Int. Cl.

| G06F 3/033 | (2013.01) |
|---|---|
| G09G 3/20 | (2006.01) |
| G06F 3/14 | (2006.01) |
| G09G 5/00 | (2006.01) |
| G09G 5/36 | (2006.01) |

(52) U.S. Cl.
CPC ........ G06F 3/033 (2013.01); G09G 3/20 (2013.01); G09G 2340/0492 (2013.01); G09G 2354/00 (2013.01); G06F 3/14 (2013.01); G09G 5/00 (2013.01); G09G 5/36 (2013.01)

(58) Field of Classification Search
CPC .......... G09G 5/00; G09G 5/08; G06F 1/1626; G06F 2200/1637; G06F 3/0346; G06F 3/017; G06F 3/03
See application file for complete search history.

(56) References Cited

U.S. PATENT DOCUMENTS

| 2002/0109782 A1 | 8/2002 | Ejima et al. |
| 2005/0062715 A1 | 3/2005 | Tsuji et al. |
| 2009/0201257 A1 | 8/2009 | Saitoh et al. |

(Continued)

FOREIGN PATENT DOCUMENTS

| CN | 101256456 A | 9/2008 |
| CN | 101506760 A | 8/2009 |
| EP | 1 517 220 A2 | 3/2005 |

(Continued)

OTHER PUBLICATIONS

User's Manual for docomo PRO series SH-03B, NTTD Docomo, Jan. 2010.

(Continued)

*Primary Examiner* — Michael Faragalla
(74) *Attorney, Agent, or Firm* — Maschoff Brennan

(57) ABSTRACT

A control unit changes a display orientation of a display screen according to a tilt direction of a display unit when a display orientation detection unit detects the display orientation of the display screen coincides with, among orientations in which the display screen is allowed to be displayed, an orientation closest to a vertical downward direction in a state where the detected display orientation of the display screen is not changed according to the tilt direction of the display unit. The display orientation detection unit detects the display orientation of the display screen displayed on the display unit. A tilt detection unit detects the tilt direction of the display unit, which displays information, in relation to the vertical downward direction.

12 Claims, 24 Drawing Sheets

(56) References Cited

U.S. PATENT DOCUMENTS

| | | | |
|---|---|---|---|
| 2010/0171693 A1* | 7/2010 | Tamura et al. | 345/156 |
| 2010/0214216 A1* | 8/2010 | Nasiri et al. | 345/158 |

FOREIGN PATENT DOCUMENTS

| | | |
|---|---|---|
| EP | 1 892 611 A1 | 2/2008 |
| JP | 10-240436 A | 9/1998 |
| JP | 2000-250434 A | 9/2000 |
| JP | 2004-226715 A | 8/2004 |
| JP | 2005-092702 A | 4/2005 |
| JP | 2005-323031 A | 11/2005 |
| JP | 2007-155796 A | 6/2007 |
| JP | 2008-131616 A | 6/2008 |
| WO | 2006/126310 A1 | 11/2006 |

OTHER PUBLICATIONS

First Notification of Office Action for corresponding Chinese Patent Application No. 2010800678132, dated Jul. 21, 2014.
*User's Manual for PRO Series SH-03B, NTT DOCOMO*, Feb. 2010.
International Search Report dated Aug. 3, 2010 in application No. PCT/JP2010/061417.

* cited by examiner

CONTROL TABLE 103a

| NAME | VALUE (DEGREE) |
|---|---|
| G1 | 0 DEGREE |
| D1 | 0 DEGREE |
| D2 | −1 DEGREE |

FIG. 6

APPLICATION TABLE                                  104a

| APPLICATION NAME | PATH | ROTATION RESUME FLAG |
| --- | --- | --- |
| AP1 | C:¥AP1.EXE | TRUE |
| AP2 | C:¥AP2.EXE | FALSE |

FIG. 7

DETECTED TILT TABLE 205a

| NUMBER | ANGLE |
|---|---|
| 1 | +33(DEGREES) |
| 2 | +38(DEGREES) |
| 3 | +44(DEGREES) |
| 4 | +49(DEGREES) |
| 5 | +42(DEGREES) |
| 6 | +36(DEGREES) |
| ⋮ | ⋮ |
| 30 | −18(DEGREES) |

FIG. 19

ELECTRONIC APPARATUS, CONTROL PROGRAM, AND CONTROL METHOD

CROSS-REFERENCE TO RELATED APPLICATION

This application is a continuation application of International Application PCT/JP2010/061417 filed on Jul. 5, 2010 and designated the U.S., the entire contents of which are incorporated herein by reference.

FIELD

The embodiments discussed herein are related to an electronic apparatus, a control program, and a control method.

BACKGROUND

At present, there are electronic apparatuses as represented by information processing apparatuses including portable notebook personal computers (laptop computers), such as tablet and convertible personal computers (PCs), and portable information terminals. Some of these electronic apparatuses are capable of changing the display orientation of the display screen according to the orientation of the own electronic apparatus. Among such electronic apparatuses, some are known for the function of changing the display orientation of the display screen according to a user operation.

In addition, some electronic apparatuses are known to be provided with a sensor, such as an accelerometer sensor and a gyroscope, in order to detect the orientation of the own electronic apparatus. The sensor detects the direction of gravitational force or the direction of motion. When a user changes the orientation of such an electronic apparatus, the sensor enables the electronic apparatus to automatically change the display orientation of the display screen according to the orientation change made by a user. With this, a user is always able to view the display screen and operate the electronic apparatus in a proper orientation.

As for such an electronic apparatus that automatically changes the display orientation, it is sometimes the case that the orientation of the electronic apparatus, detected by a sensor, does not coincide with the actual orientation in which a user is viewing the display screen, which may cause difficulty for the user to view the display screen. That is, with the function of automatically changing the display orientation of the display screen, the display orientation of the display screen is determined according to the detected orientation of the electronic apparatus. As a result, the determined display orientation of the display screen may not always coincide with the display orientation of the display screen desired by a user, such as the orientation in which the user is viewing the display screen. In view of this problem, some electronic apparatuses allow users to make a choice to disable the automatic change of the display orientation of the display screen.

Japanese Laid-open Patent Publication No. 2008-131616
Japanese Laid-open Patent Publication No. 2004-226715

However, it is burdensome to change, on a case-by-case basis, the setting regarding whether to disable the automatic change of the display orientation. In addition, it requires that an appropriate setting according to the situation has to be made in advance. That is, in some cases, the function of automatically changing the display orientation is wasted because automatic change of the display orientation is disabled in the situation where the change of the display orientation is necessary, and in other cases, a user may experience difficulty in viewing the display screen because the function of automatically changing the display orientation is enabled in the situation where the change of the display orientation is not necessary.

SUMMARY

In one aspect of the embodiments, there is provided an electronic apparatus which includes a tilt sensor configured to detect a tilt direction of a display, which displays information, in relation to a vertical downward direction; and a processor configured to perform a procedure including: acquiring, from the tilt sensor, a detection result of the tilt direction of the display and detecting a display orientation of a display screen displayed on the display; and changing the display orientation of the display screen according to the tilt direction of the display when the display orientation of the display screen is detected to coincide with, among orientations in which the display screen is allowed to be displayed, an orientation closest to the vertical downward direction in a state where the display orientation of the display screen is not changed according to the tilt direction of the display.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 6 illustrates a control table according to the second embodiment;

FIG. 7 illustrates an application table according to the second embodiment;

FIG. 19 illustrates a detected tilt table according to the third embodiment;

DESCRIPTION OF EMBODIMENTS

Next, embodiments are described with reference to the accompanying drawings.

First Embodiment

Figure 1:
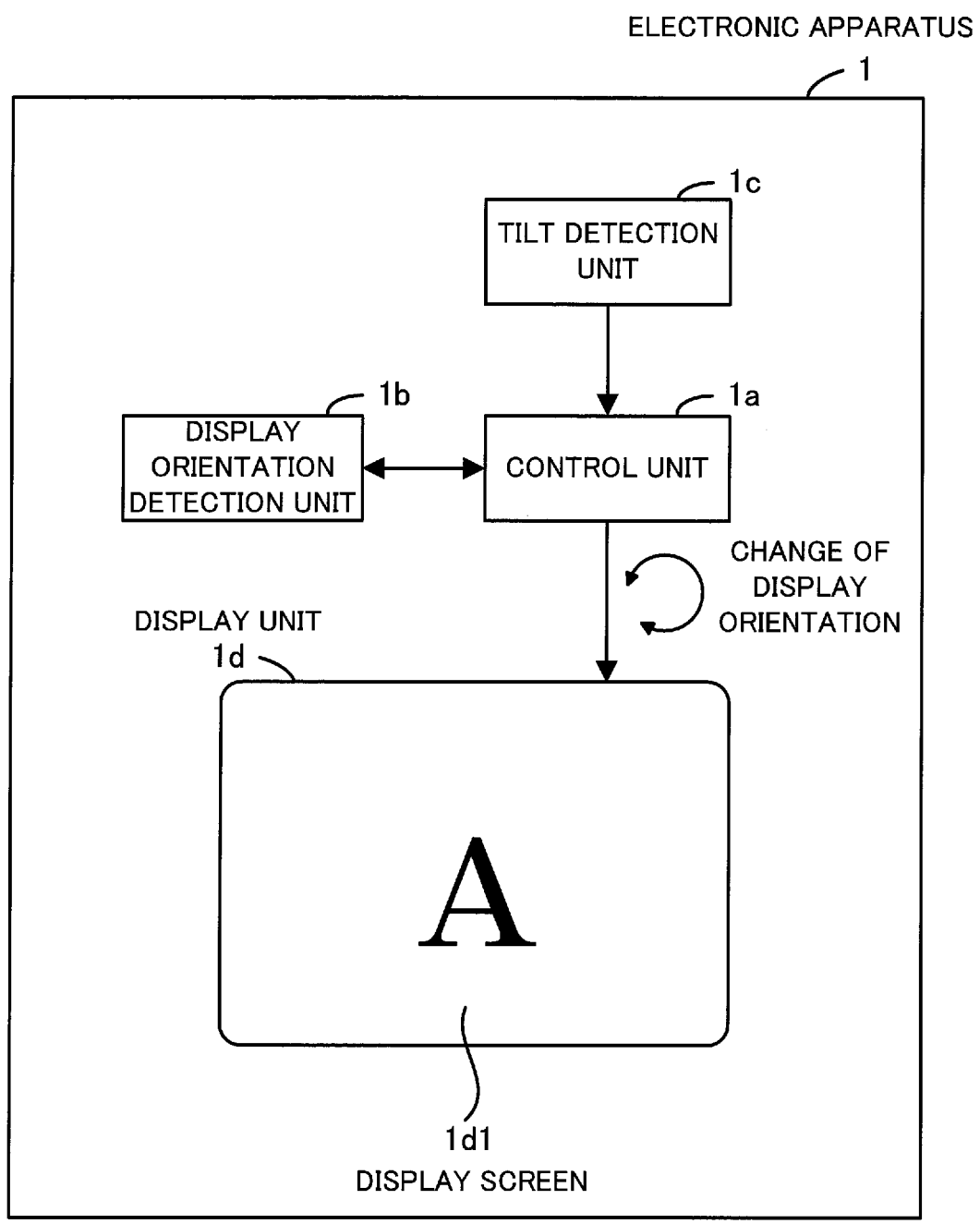
FIG. 1 illustrates an electronic apparatus according to a first embodiment.

FIG. 1 illustrates an electronic apparatus according to a first embodiment. An electronic apparatus 1 of FIG. 1 changes the display orientation of a display screen 1*d*1 according to the orientation of a display unit 1*d* of the electronic apparatus 1. The electronic apparatus 1 includes a control unit 1*a*, a display orientation detection unit 1*b*, a tilt detection unit 1*c*, and the display unit 1*d*. In addition, the display screen 1*d*1 is displayed on the display unit 1*d*.

In a temporary stop state where the display orientation of the display screen 1*d*1, detected by the display orientation detection unit 1*b*, is not changed according to the tilt direction of the display unit 1*d*, the control unit 1*a* changes the display orientation of the display screen 1*d*1 according to the tilt direction of the display unit 1*d* if the display orientation of the display screen 1*d*1, detected by the display orientation detection unit 1*b*, coincides with, among orientations in which the display screen 1*d*1 is allowed to be displayed, an orientation closest to a vertical downward direction.

In addition, when the display orientation of the display screen 1*d*1, detected by the display orientation detection unit 1*b*, does not coincide with a previous latest display orientation which is a display orientation most recently changed according to the tilt direction of the display unit 1*d*, the control unit 1*a* enables a temporary stop state flag to make a transition to a temporary stop state. Here, the temporary stop state flag is a flag indicating a temporary stop state or not. The temporary stop state flag is enabled in order to set a temporary stop state, and disabled in order to release the temporary stop state. The temporary stop state flag is stored in a storage unit (not illustrated) included in the control unit 1*a*. With this, when the display orientation of the display screen 1*d*1 is different from the previous latest display orientation before the automatic change, automatic change of the display orientation is temporarily stopped.

Here, even when a temporary stop state has been set, it is possible to change the display orientation of the display screen 1*d*1 by a user operation or an application. In addition, the previous latest display orientation is a display orientation of the display screen 1*d*1, most recently changed by the control unit 1*a* according to the tilt direction of the display unit 1*d*. That is, the display orientation of the display screen 1*d*1, changed by a user operation or an application, is not referred to as the previous latest display orientation. In the case where the display orientation of the display screen 1*d*1 is changed by a user operation or an application, the previous latest display orientation is not updated. With this, in the case of changing the display orientation of the display screen 1*d*1 from the previous latest display orientation, that is, in the case where the display orientation is changed, not by the control unit 1*a* according to the tilt direction of the display unit 1*d*, but by a user or an application, it is possible to temporarily stop automatic change to be made by the control unit 1*a* and maintain the display orientation changed by the user or the application.

In addition, during a temporary stop state which is set by enabling the temporary stop state flag, the control unit 1*a* does not change the display orientation of the display screen 1*d*1. On the other hand, if the display orientation of the display screen 1*d*1, detected by the display orientation detection unit 1*b*, is not a predetermined orientation during a non-temporary stop state which is set by disabling the temporary stop state flag, the control unit 1*a* changes the display orientation of the display screen 1*d*1 according to the tilt direction of the display unit 1*d* and also sets the changed display orientation of the display screen 1*d*1 as the previous latest display orientation.

Here, the predetermined orientation in regard to the display orientation of the display screen 1*d*1 may be, for example, the vertical downward direction or a preset orientation desired by a user.

At this point, for example, if the downward orientation of the display unit 1*d* coincides with the vertical downward direction, the control unit 1*a* rotates the display screen 1*d*1 in such a manner that the downward orientation of the display screen 1*d*1 coincides with the downward orientation of the display unit 1*d*. In addition, if the downward orientation of the display unit 1*d* coincides with the rightward direction to a user facing the display unit 1*d*, the control unit 1*a* rotates the display screen 1*d*1 in such a manner that the downward orientation of the display screen 1*d*1 coincides with the leftward orientation of the display unit 1*d*. In addition, if the downward orientation of the display unit 1*d* coincides with the vertical upward direction, the control unit 1*a* rotates the display screen 1*d*1 in such a manner that the downward orientation of the display screen 1*d*1 coincides with the upward orientation of the display unit 1*d*. Further, if the downward orientation of the display unit 1*d* coincides with the leftward direction to a user facing the display unit 1*d*, the control unit 1*a* rotates the display screen 1*d*1 in such a manner that the downward orientation of the display screen 1*d*1 coincides with the rightward orientation of the display unit 1*d*. Thus, in the operation of automatically changing the display orientation of the display screen 1*d*1, the control unit 1*a* rotates the display orientation of the display screen 1*d*1 according to the tilt direction of the display unit 1*d* in such a manner that the downward orientation of the display screen 1*d*1 coincides with the vertical downward direction. In this way, the control unit 1*a* controls the display orientation of the display screen 1*d*1 easier for a user to view the display screen 1*d*1.

The display orientation detection unit 1b detects the display orientation of the display screen 1d1 displayed on the display unit 1d. For example, the control unit 1a may notify the display orientation detection unit 1b of the latest display orientation of the display unit 1d according to control of the display orientation of the display unit 1d, and, then, the display orientation detection unit 1b may detect the display orientation of the display screen 1d1 based on the notification by the control unit 1a.

The tilt detection unit 1c detects a tilt direction of the display unit 1d in relation to the vertical downward direction. The tilt detection unit 1c detects the tilt direction of the display unit 1d, for example, by detecting the direction of gravitational force or the direction of motion using an accelerometer sensor or a gyroscope. Note that, if the orientation of the display unit 1d is the same as the orientation of the electronic apparatus 1, the tilt detection unit 1c may detect the tilt direction of the electronic apparatus 1 as the tilt direction of the display unit 1d.

The display unit 1d is configured to display, in multiple orientations (for example, four orientations of "up", "down", "left", and "right"), the display screen 1d1 for displaying information of, for example, a letter "A". Note that the display unit 1d may be configured to display the display screen 1d1 at arbitrary angles. Note that the information displayed on the display screen 1d1 is not limited to textual information, and may be image information, such as a video and a still image, for example.

In the above-described manner, it is possible to adequately control enabling and disabling of the function of automatically changing the display orientation of the display screen.

Second Embodiment

Figure 2:
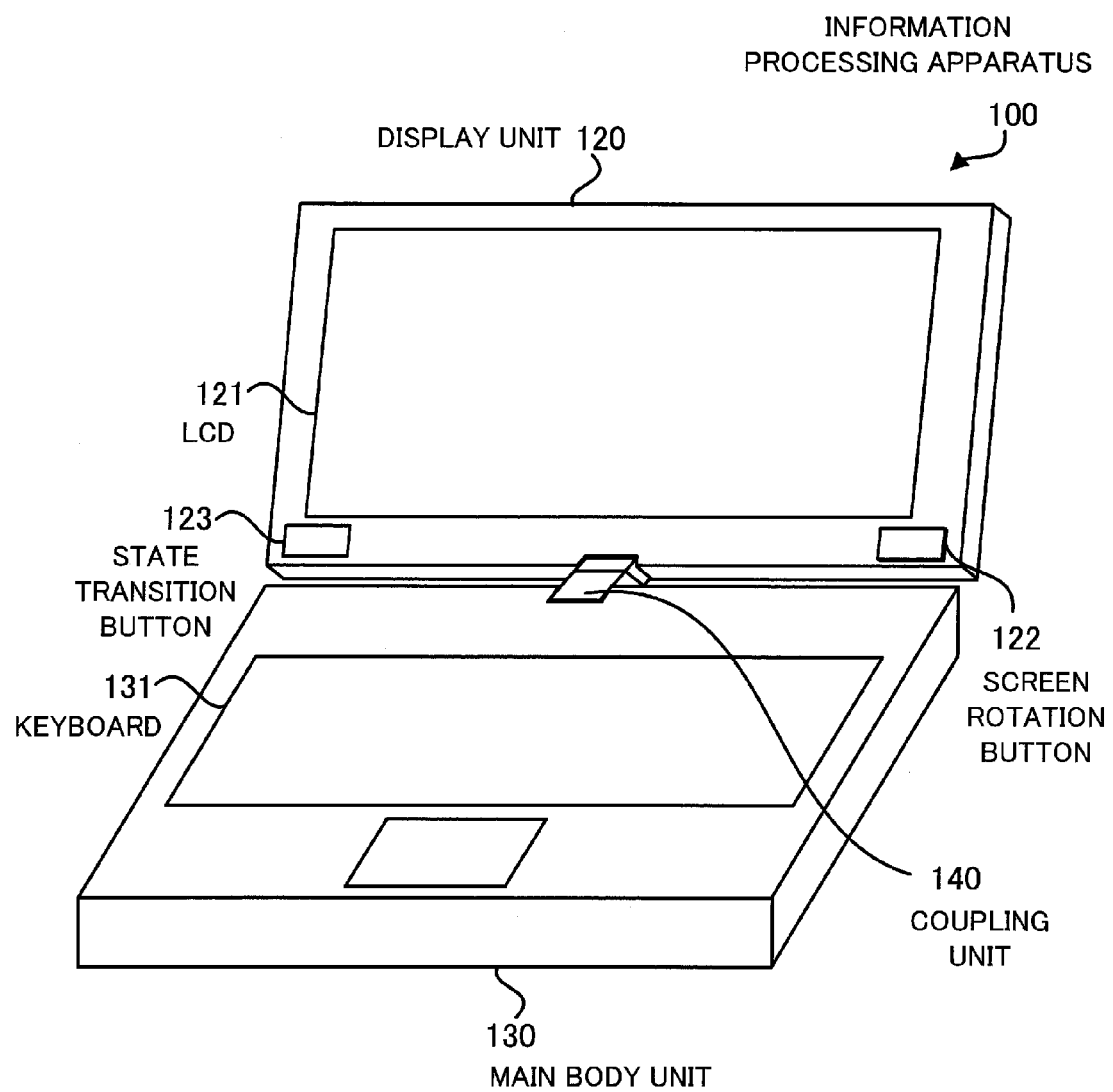
FIG. 2 illustrates an appearance of an information processing apparatus according to a second embodiment.
Figure 3:
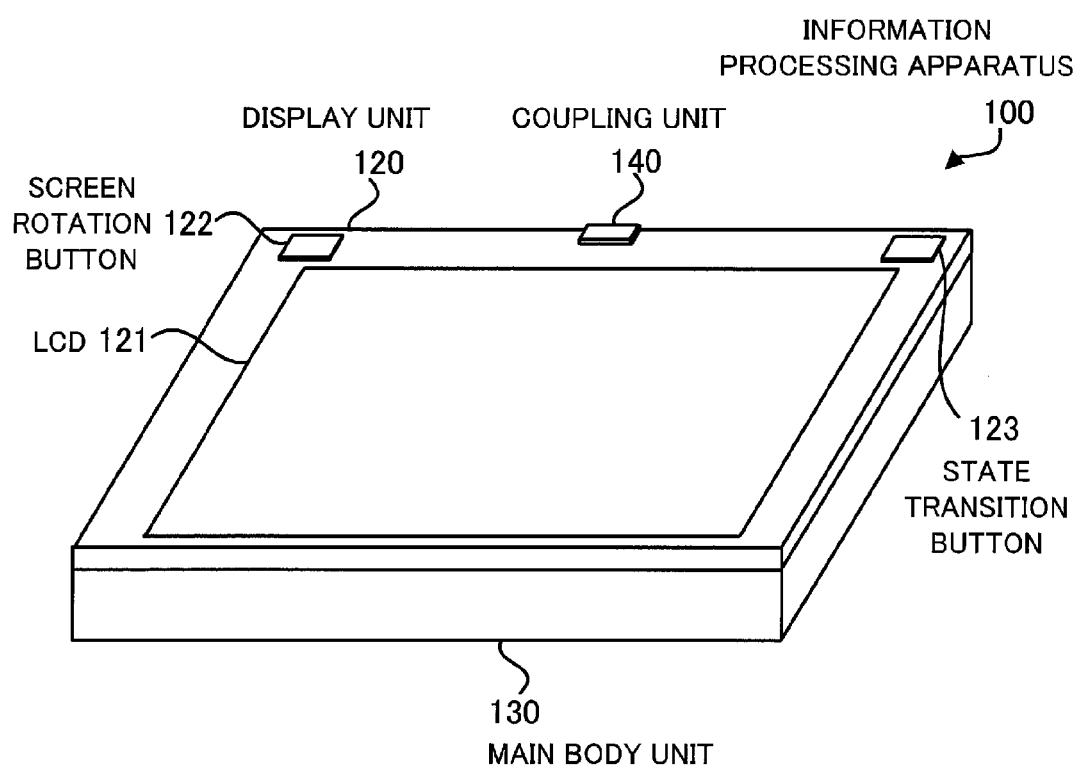
FIG. 3 illustrates an appearance of the information processing apparatus according to the second embodiment.

FIGS. 2 and 3 each illustrate an appearance of an information processing apparatus according to a second embodiment. FIG. 2 illustrates an information processing apparatus 100 with a display unit 120 open (normal use state). FIG. 3 illustrates the information processing apparatus 100 with the display unit 120 closed and a LCD (liquid crystal display) 121 facing upward (tablet state).

The information processing apparatus 100 of FIGS. 2 and 3 is a convertible notebook PC configured to be switched among a normal use state, a tablet state, and a housed state to be described later. The information processing apparatus 100 includes the display unit 120 having the LCD 121 and a screen rotation button 122, a main body unit 130 having electronic components, such as a keyboard 131 and a CPU (central processing unit), and a coupling unit 140 connecting the display unit 120 and the main body unit 130.

The LCD 121 is a display device having a display screen for displaying text or images. Instead of an LCD, a different type of flat-screen display device, such as an organic EL (electroluminescence) display, may be used as the display device.

The screen rotation button 122 is a button for receiving an operation for rotating the display orientation of the display screen (display orientation change operation) displayed on the LCD 121 when pressed by a user. Note that although the screen rotation button 122 is provided in the display unit 120 according to this embodiment, the configuration is not limited to this and the screen rotation button 122 may be provided in the main body unit 130.

A state transition button 123 is a button for receiving an operation for making a transition to a temporary stop state (state transition operation), in which a display screen 121a of the LCD 121 is not automatically rotated, when pressed by a user. Note that although the state transition button 123 is provided in the display unit 120 according to this embodiment, the configuration is not limited to this and the state transition button 123 may be provided in the main body unit 130.

The keyboard 131 is an input device that allows inputs of text and other operations.

The coupling unit 140 includes an opening and closing shaft (not illustrated) for coupling the display unit 120 and the main body unit 130 in such a manner as to be openable and closable with respect to each other; and a pivot shaft (not illustrated) that intersects with the opening and closing shaft and couples the display unit 120 and the main body unit 130 in such a manner as to be rotatable relative to each other. The opening and closing shaft and the pivot shaft of the coupling unit 140 enable the display unit 120 to be opened, closed, and rotated relative to the main body unit 130. In this manner, the information processing apparatus 100 may be switched among three states: the normal use state illustrated in FIG. 2; the tablet state illustrated in FIG. 3; and the housed state (not illustrated) in which the display unit 120 is closed with the LCD 121 facing inside.

Note that this embodiment uses a convertible notebook PC as the information processing apparatus 100. However, the configuration is not limited to this, and a tablet notebook PC may be used, which is made by integrally or fixedly forming a display unit and a main body unit and is always used in a tablet state. In addition, a different type of notebook PC may be used. Further, an electronic apparatus having a display function, such as a portable information terminal other than a notebook PC, may be used.

Figure 4:
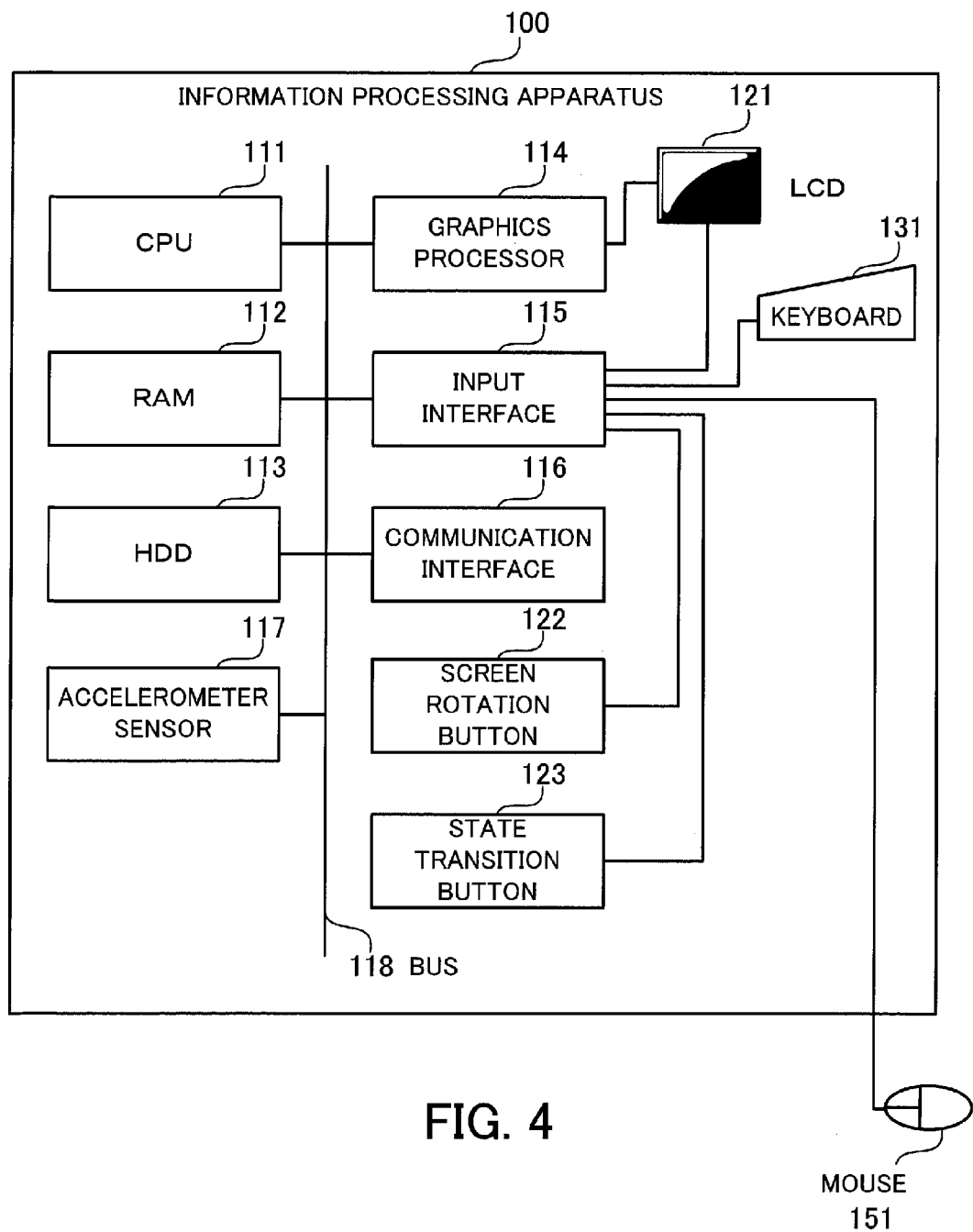
FIG. 4 is a hardware configuration diagram of the information processing apparatus according to the second embodiment.

FIG. 4 is a hardware configuration diagram of an information processing apparatus according to the second embodiment. The entire information processing apparatus 100 is controlled by a CPU (central processing unit) 111. Connected to the CPU 111 via a bus 118 are a RAM (random access memory) 112 and multiple peripheral devices.

The RAM 112 is used as a main memory device of the information processing apparatus 100. The RAM 112 temporarily stores at least part of an OS (operating system) program and applications to be executed by the CPU 111. In addition, the RAM 112 also stores various types of data required by CPU 111 for its processing.

The peripheral devices connected to the bus 118 include an HDD (hard disk drive) 113, a graphics processor 114, an input interface 115, a communication interface 116, and an accelerometer sensor 117.

The HDD 113 stores data to be used by the OS and applications of the information processing apparatus 100.

To the graphics processor 114, a display device such as the LCD 121 is connected. The graphics processor 114 displays images on the display screen of a display device, such as the LCD 121, according to an instruction issued by the CPU 111. In addition, the graphics processor 114 and the LCD 121 are connected to each other with, for example, a serial communication cable, and transmit and receive a control signal and an image signal alternately.

To the input interface 115, input devices such as the built-in keyboard 131, the LCD 121, the screen rotation button 122, and the state transition button 123 are connected. In addition, external input devices, such as a mouse 151, may be connected to the input interface 115. The input interface 115 outputs signals transmit from the input devices including the keyboard 131 to the CPU 111 via the bus 118.

The communication interface 116 is connected to a network (not illustrated). The communication interface 116 is capable of transmitting and receiving data to and from other computers and communication apparatuses via the network.

The accelerometer sensor 117 is provided in the display unit 120 in order to detect a tilt direction of the LCD 121 with respect to the vertical downward direction. The accelerometer sensor 117 detects the tilt direction of the LCD 121 based on the gravitational acceleration applied to the information processing apparatus 100. Subsequently, the accelerometer sensor 117 outputs, to the CPU 111, data indicating the detected tilt direction. As the accelerometer sensor 117, a dual-axis sensor may be used, which is capable of detecting tilts around two axes: for example, an x-axis (for example, an axis extending in the up-and-down direction of the LCD 121) and a Y-axis (for example, an axis extending in the left-and-right direction of the LCD 121) lying in a plane parallel to the display screen 121a of the LCD 121 provided in the display unit 120. The accelerometer sensor 117 detects the tilt direction of the LCD 121 with respect to the vertical direction, in four orientations of "up", "down", "left", and "right" on the plane surface of the LCD 121, defined by combining the x-axis direction and the y-axis direction.

Note that the data indicating the tilt direction, which is output from the accelerometer sensor 117, may be an absolute value (for example, an angle between projection onto the plane surface of the display screen 121a, that is, the vertical downward direction, and the downward orientation on the plane surface of the display screen 121a), or may represent the amount of instantaneous change in tilt.

The LCD 121 is configured to display the display screen 121a in four orientations of "up", "down", "left", and "right" according to the motion of the information processing apparatus 100. In addition, the LCD 121 detects contact of a stylus with the display surface provided in the front surface of the LCD 121 by detecting changes in pressure or static electricity on the display surface. With this, the LCD 121 is able to receive an input made by a user, such as an input of text and a selection of an icon displayed on the display surface. As described above, the LCD 121 according to this embodiment is capable of displaying the display screen 121a in four orientations, however, the LCD 121 may display the display screen 121a in three or less orientations, or five or more orientations (for example, eight orientations of "up", "down", "left", "right", "upper left", "upper right", "lower left", and "lower right", or an infinite number of orientations which are set in a continuous manner).

The screen rotation button 122 receives a display orientation change operation for changing the display orientation of the display screen 121a by rotating the display screen 121a. Although the details are described later, according to this embodiment, when a user presses the screen rotation button 122 once, the display content of the display screen 121a is rotated 90 degrees clockwise. With this, the user is able to change the display orientation of the display screen 121a to a desired orientation by repeatedly pressing the screen rotation button 122 until the display content of the display screen 121a is set in the desired display orientation. Note that the way to receive a display orientation change operation for changing the display orientation of the display screen 121a is not limited to this. The change of the display orientation of the display screen 121a may be achieved by an arbitrary operation procedure, for example, by directly receiving an input representing the desired display orientation via an arrow key, or by receiving, in a prepared display orientation input window (not illustrated), an input of the desired display orientation via the mouse 151.

The state transition button 123 receives a state transition operation for making a transition to a temporary stop state, where the display screen 121a is not automatically rotated. Although the details are described later, according to this embodiment, a control unit 101 of the information processing apparatus 100 makes a transition to a temporary stop state when a user presses the state transition button 123 once. With this, when not wanting automatic rotation of the display screen 121a, the user presses the state transition button 123 to thereby stop the function of automatic rotation. Note that the way to receive a state transition operation for making a transition to a temporary stop state is not limited to this. A transition to a temporary stop state may be achieved by an arbitrary operation procedure, for example, by receiving, in a prepared state transition input window (not illustrated), an input for a temporary stop state transition via the mouse 151, or by receiving an input for a temporary stop state transition via a prepared state transition button displayed on the display screen 121a.

With the above-described hardware configuration, the processing functions of this embodiment are achieved.

Figure 5:
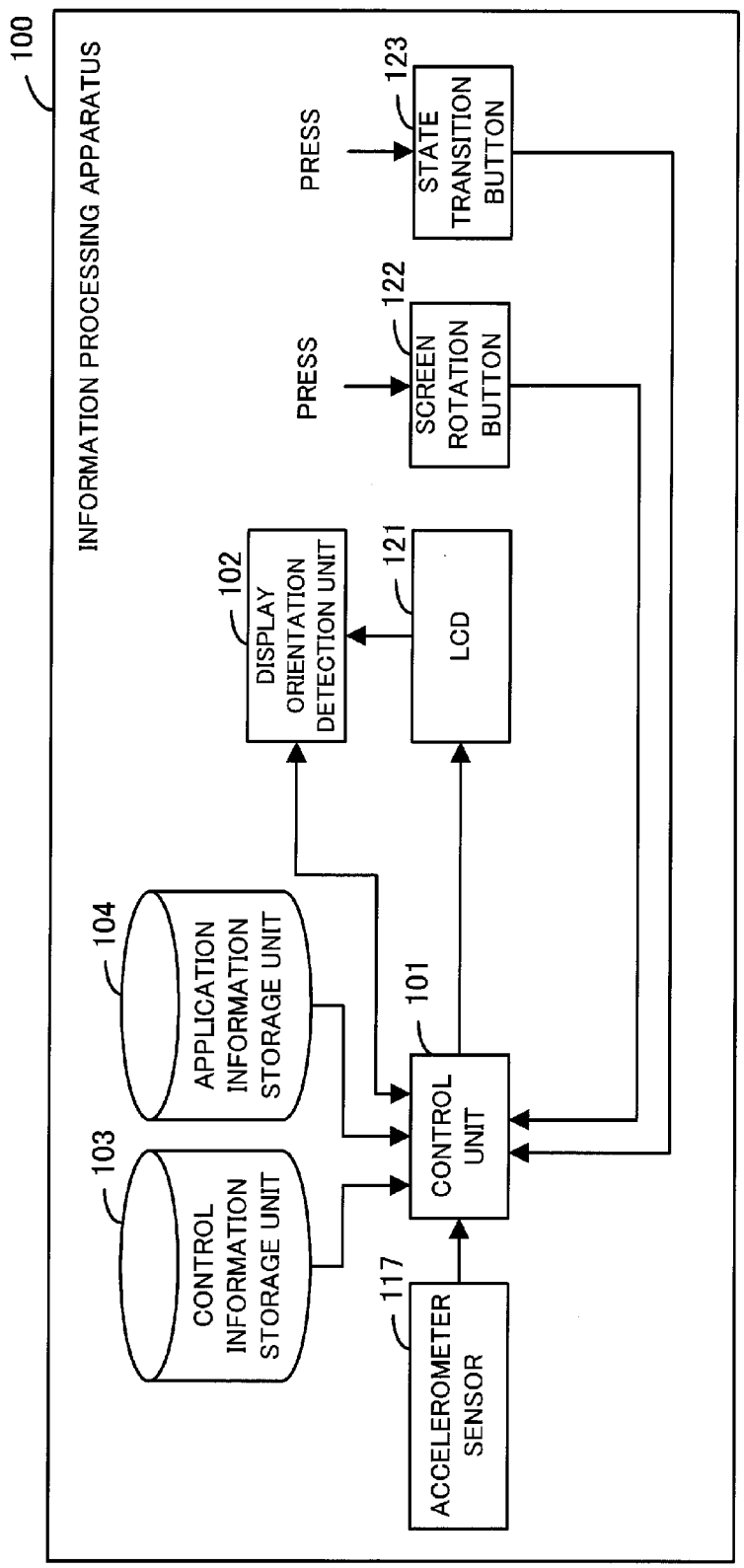
FIG. 5 is a block diagram of the information processing apparatus according to the second embodiment.

FIG. 5 is a block diagram of an information processing apparatus according to the second embodiment. The information processing apparatus 100 of FIG. 5 has a function of displaying images. The information processing apparatus 100 includes the control unit 101, a display orientation detection unit 102, a control information storage unit 103, an application information storage unit 104, the accelerometer sensor 117, the LCD 121, the screen rotation button 122, and the state transition button 123.

In a temporary stop state where the display orientation of the display screen 121a, detected by the display orientation detection unit 102, is not changed according to the tilt direction of the LCD 121, the control unit 101 changes the display orientation of the display screen 121a according to the tilt direction of the LCD 121 if the display orientation of the display screen 121a, detected by the display orientation detection unit 102, coincides with, among orientations in which the display screen 121a is allowed to be displayed, an orientation closest to a vertical downward direction.

More specifically, the control unit 101 uses the vertical downward direction as the base, i.e., ±0 degree, and a counterclockwise rotation from the vertical downward direction is represented by a + (positive) angle in degrees and a clockwise rotation from the vertical downward direction is represented by a − (negative) angle in degrees. In this condition, when the angle of LCD 121 detected by the accelerometer sensor 117 falls within the range of −44 (+316) to +45 degrees, the control unit 101 determines that the angle of the LCD 121 is 0 degree. Similarly, when the angle of the LCD 121 detected by the accelerometer sensor 117 falls within the range of +46 to +135 degrees, the control unit 101 determines that the angle of the LCD 121 is 90 degrees. When the angle of the LCD 121 detected by the accelerometer sensor 117 falls within the range of +136 to −135 (+225) degrees, the control unit 101 determines that the angle of the LCD 121 is 180 degrees. When the angle of the LCD 121 detected by the accelerometer sensor 117 falls within the range of −134 (+226) to −45 (+315) degrees, the control unit 101 determines that the angle of the LCD 121 is 270 degrees.

In addition, when the display orientation of the display screen 121a, detected by the display orientation detection unit 102, does not coincide with a previous latest display orientation which is a display orientation most recently changed according to the tilt direction of the LCD 121, the control unit 101 enables a temporary stop state flag to make a transition to a temporary stop state. Here, the temporary stop state flag is a flag indicating a temporary stop state or not. The temporary stop state flag is enabled in order to set a temporary stop state, and disabled in order to release the temporary stop state. The temporary stop state flag is stored in the RAM 112. With this, when the display orientation of the display screen 121*a* is different from the previous latest display orientation before the automatic change, automatic change of the display orientation is temporarily stopped.

Here, even when a temporary stop state has been set, it is possible to change the display orientation of the display screen 121*a* by a user operation or an application. In addition, the previous latest display orientation is a display orientation of the display screen 121*a*, most recently changed by the control unit 101 according to the tilt direction of the LCD 121. That is, the display orientation of the display screen 121*a*, changed by a user operation or an application, is not referred to as the previous latest display orientation. In the case where the display orientation of the display screen 121*a* is changed by a user operation or an application, the previous latest display orientation is not updated. With this, in the case of changing the display orientation of the display screen 121*a* from the previous latest display orientation, that is, in the case where the display orientation is changed, not by the control unit 101 according to the tilt direction of the LCD 121, but by a user or an application, it is possible to temporarily stop automatic change to be made by the control unit 101 and maintain the display orientation changed by the user or the application.

In addition, during a temporary stop state which is set by enabling the temporary stop state flag, the control unit 101 does not change the display orientation of the display screen 121*a*. On the other hand, if the display orientation of the display screen 1*d*1, detected by the display orientation detection unit 102, is not a predetermined orientation during a non-temporary stop state which is set by disabling the temporary stop state flag, the control unit 101 changes the display orientation of the display screen 121*a* according to the tilt direction of the LCD 121 and also sets the changed display orientation of the display screen 121*a* as the previous latest display orientation. Here, the predetermined orientation concerning the display orientation of the display screen 121*a* may be, for example, the vertical downward direction or a preset orientation desired by a user.

At this point, if the downward orientation of the LCD 121 coincides with the vertical downward direction, the control unit 101 rotates the display screen 121*a* in such a manner that the downward orientation of the display screen 121 a coincides with the downward orientation of the LCD 121. In addition, if the downward orientation of the LCD 121 coincides with the rightward direction to a user facing the LCD 121, the control unit 101 rotates the display screen 121*a* in such a manner that the downward orientation of the display screen 121*a* coincides with the leftward orientation of the LCD 121. In addition, if the downward orientation of the LCD 121 coincides with the vertical upward direction, the control unit 101 rotates the display screen 121*a* in such a manner that the downward orientation of the display screen 121*a* coincides with the upward orientation of the LCD 121. Further, if the downward orientation of the LCD 121 coincides with the leftward direction to a user facing the LCD 121, the control unit 101 rotates the display screen 121*a* in such a manner that the downward orientation of the display screen 121*a* coincides with the rightward orientation of the LCD 121. Thus, in the operation of automatically changing the display orientation of the display screen 121*a*, the control unit 101 rotates the display orientation of the display screen 121*a* according to the tilt direction of the LCD 121 in such a manner that the downward orientation of the display screen 121*a* coincides with the vertical downward direction. In this way, the control unit 101 controls the display orientation of the display screen 121*a* easier for a user to view the display screen 121*a*.

In addition, when the display orientation of the display screen 121*a*, detected by the display orientation detection unit 102, coincides with the tilt direction of the LCD 121, detected by the accelerometer sensor 117, the control unit 101 disables the temporary stop state flag to thereby release the temporary stop state. With this, when the display orientation of the display screen 121*a* coincides with the tilt direction of the LCD 121, the display orientation of the display screen 121*a* is set to be automatically changed.

In addition, when the screen rotation button 122 receives a press operation (display orientation change operation) performed thereon by a user, the control unit 101 rotates the display orientation of the display screen 121*a* 90 degrees clockwise in response to the press. With this, the user is able to change the display orientation of the display screen 121*a* to a desired angle by repeatedly pressing the screen rotation button 122 until the display angle of the display screen 121*a* is set at the desired angle.

In addition, in the case where a rotation resume flag held by application information is enabled, the control unit 101 disables the temporary stop state flag when closing a corresponding application. In addition, the control unit 101 disables the temporary stop state flag when the information processing apparatus 100 returns from a power-saving mode, when a transition is made from logoff mode to logon mode, or when a user switch is performed. With this, automatic change of the display orientation of the display screen 121*a* is resumed in the case where automatic change of the display orientation of the display screen 121*a* has been temporarily stopped, for example, during application execution, during operation in power-saving mode, during logoff, or during the use by another user.

In addition, according to an instruction of an application operating on the information processing apparatus 100, the control unit 101 changes the display orientation of the display screen 121*a*. Applications which cause the display orientation of the display screen 121*a* to be changed include various types of applications which cause the display orientation of the display screen 121*a* to be changed, for example, at the time when an operation screen or other information is displayed on the display screen 121*a*. Applications which display, on the display screen 121*a*, information such as text information and image information including a video and a still image, and music reproduction applications are examples of such application.

In addition, the control unit 101 enables the temporary stop state flag if the state transition button 123 receives a press operation (state transition operation) performed thereon by a user when the display orientation of the display screen 121*a*, detected by the accelerometer sensor 117, is set to be changed according to the tilt direction of the LCD 121 (i.e., when the temporary stop state flag has been disabled and, therefore, a temporary stop state has been released). With this, the control unit 101 enters a temporary stop state in which the display orientation of the display screen 121*a*, detected by the accelerometer sensor 117, is not changed according to the tilt direction of the LCD 121. With this, when not wanting automatic rotation of the display screen 121*a*, a user presses the state transition button 123 to thereby stop the function of automatic rotation.

The display orientation detection unit 102 detects the display orientation of the display screen 121*a* displayed on the LCD 121. For example, the control unit 101 notifies the display orientation detection unit 102 of the display orientation of the LCD 121 according to control of the display orientation of the display screen 121*a* each time the display orientation is automatically changed by the control unit 101 or changed by a user operation or an application. Note that the display orientation detection unit 102 may detect the display orientation of the display screen 121*a* based on the notification by the control unit 101.

Although the details are described later with reference to FIG. 6, the control information storage unit 103 stores control information indicating an orientation of the LCD 121, acquired by the accelerometer sensor 117; a display orientation of the display screen 121*a*, acquired by the display orientation detection unit 102; and a display orientation of the display screen 121*a*, changed by the control unit 101.

The application information storage unit 104 stores application information having rotation resume flags each indicating whether to resume, at the closing of a corresponding application, changing the display orientation of the display screen 121*a* by the control unit 101.

The accelerometer sensor 117 detects the tilt direction of the LCD 121 in relation to the vertical downward direction. The accelerometer sensor 117 detects the tilt direction of the LCD 121 with one degree increments by detecting the direction of gravitational force based on an acceleration applied to the accelerometer sensor 117. Note that, instead of the acceleration, the information processing apparatus 100 may detect a direction of motion using, for example, a gyroscope to thereby detect the tilt direction of the LCD 121. In addition, if the orientation of the LCD 121 is the same as the orientation of the information processing apparatus 100, the accelerometer sensor 117 may detect the tilt direction of the information processing apparatus 100 as the tilt direction of the LCD 121.

The LCD 121 is configured to display the display screen 121*a*, on which information is displayed, in four orientations of "up", "down", "left", and "right". Note however that, instead of the four orientations, the LCD 121 may display the display screen 121*a* in three or less orientations, or five or more orientations. Further, the LCD 121 may display the display screen 121*a* at arbitrary angles instead. In addition, on the display screen 121*a*, textual information and image information, such as a video and a still image, may be displayed.

The screen rotation button 122 receives a display orientation change operation performed thereon by a user, which operation is to change the display orientation of the display screen 121*a*. When a user presses the screen rotation button 122, the display orientation of the display screen 121*a* rotates 90 degrees clockwise.

Here, a user is able to rotate the display orientation of the display screen 121*a* 90 degrees by pressing the screen rotation button 122 once. With this, the user is able to adjust the display screen 121*a* to a desired angle by pressing the screen rotation button 122 multiple times until the display screen 121*a* is set at the desired angle.

The state transition button 123 receives a state transition operation performed thereon by a user, which operation is to make a transition to a temporary stop state in which the display orientation of the display screen 121*a*, detected by the accelerometer sensor 117, is not changed according to the tilt direction of the LCD 121. If a user presses the state transition button 123 when a temporary stop state has been released, a transition is made to a temporary stop state. With this, when not wanting the automatic rotation of the display screen 121*a*, a user presses the state transition button 123 to thereby stop the function of automatic rotation.

Generally, as for information processing apparatuses that automatically change the display orientation of the display screen, it is sometimes the case that the orientation of the information processing apparatus, detected by a sensor, does not coincide with the actual orientation in which a user is viewing the display screen. In this case, since the display orientation of the display screen is determined according to the detected orientation of information processing apparatus, the orientation in which the user is viewing the display screen may not coincide with the display orientation of the display screen desired by the user.

In view of this, it may be considered to provide, for example, a display rotation button for changing the display screen to be set in an arbitrary orientation so that a user is able to change the display orientation of the display screen to a desired display orientation when the display orientation set as a result of automatically changing the display orientation of the display screen according to a detected orientation of the information processing apparatus (for example, the downward orientation of the display screen lies in the vertical direction) does not coincide with the display orientation desired by the user (for example, the downward orientation of the display screen lies in the rightward direction).

In this case, however, if the display screen is changed according to the detected orientation of the information processing apparatus in such a manner that the downward orientation of the display screen lies in the vertical direction and, subsequently, the user manually changes the display orientation of the display screen in such a manner that the downward orientation of the display screen lies in the rightward direction, the automatic change function for the display orientation again changes the display screen according to the detected orientation of the information processing apparatus in such a manner that the downward orientation of the display screen lies in the vertical direction. Thus, in the case where the display orientation of the display screen automatically changed according to the detected orientation of the information processing apparatus is different from the display orientation of the display screen, desired by the user, the user may not be able to have the display screen in the desired display orientation even by manually changing the display orientation.

On the other hand, according to the information processing apparatus 100, the control unit 101 temporarily stops automatic change of the display orientation of the display screen 121*a* if the display orientation is different from the automatically changed display orientation. With this, when a user changes the display orientation, it is possible to stop automatic change of the display orientation. Accordingly, this allows appropriate control of changing the display orientation of the display screen 121*a*.

FIG. 6 illustrates a control table according to the second embodiment. A control table 103*a* illustrated in FIG. 6 is created and managed by the control unit 101, and is stored in the HDD 113 which serves as the control information storage unit 103. The control table 103*a* is a table for storing control information which indicates the orientation of the information processing apparatus 100 and the display orientation of the display screen 121*a* and is used for controlling the display orientation of the display screen 121*a*.

Provided in the control table 103*a* are an entry of "G1" indicating the latest tilt direction of the LCD 121 of the information processing apparatus 100; an entry of "D1" indicating the latest display orientation of the display screen 121*a*; and an entry of "D2" indicating a display orientation of the display screen 121*a* most recently automatically changed prior to D1. The control information is configured, in which information of the individual entries is associated with each other.

G1 is a value indicting the last acquired tilt direction of the information processing apparatus 100 expressed as an angle. G1 takes any one of values "0", "90", "180", and "270" degrees. G1 takes a value of "0" when the downward orientation on the plane surface of the LCD 121 in the information processing apparatus 100 coincides with the projection direction onto the plane surface of the LCD 121 (i.e., the vertical direction), that is, when the up-and-down orientation of the LCD 121 coincides with the up-and-down direction in the vertical direction. In addition, G1 takes a value of "90" when the projection direction onto the plane surface of the LCD 121 (i.e., the vertical direction) coincides with a direction rotated 90 degrees counterclockwise from the downward orientation on the plane surface of the LCD 121, that is, when the LCD 121 with G1 taking a value of "0" is rotated 90 degrees counterclockwise to a user facing the LCD 121. Similarly, G1 takes a value of "180" when the projection direction onto the plane surface of the LCD 121 (i.e., the vertical direction) coincides with a direction rotated 180 degrees counterclockwise from the downward orientation on the plane surface of the LCD 121, that is, when the upward orientation of the LCD 121 coincides with the vertical direction. Similarly, G1 takes a value of "270" when the projection direction onto the plane surface of the LCD 121 (i.e., the vertical direction) coincides with a direction rotated 270 degrees counterclockwise from the downward orientation on the plane surface of the LCD 121, that is, when the LCD 121 with G1 taking a value of "0" is rotated 90 degrees clockwise to a user facing the LCD 121. The initial value of G1 set at the time of, for example, the start up of the information processing apparatus 100 is "0".

D1 is a value indicting the latest display orientation of the display screen 121a expressed as an angle. D1 takes any one of values "0", "90", "180", and "270" degrees. D1 takes a value of "0" when the downward orientation on the plane surface of the LCD 121 coincides with the downward orientation of the display screen 121a displayed on the LCD 121. In addition, D1 takes a value of "90" the downward orientation on the plane surface of the LCD 121 coincides with a direction rotated 90 degrees clockwise from the downward orientation of the display screen 121a displayed on the LCD 121, that is, when the display screen 121a is rotated 90 degrees clockwise with respect to the LCD 121. Similarly, D1 takes a value of "180" when the downward orientation on the plane surface of the LCD 121 coincides with a direction rotated 180 degrees clockwise from the downward orientation of the display screen 121a displayed on the LCD 121, that is, the upward orientation of the display screen 121a coincides with the downward orientation of the LCD 121. Similarly, D1 takes a value of "270" when the downward orientation on the plane surface of the LCD 121 coincides with a direction rotated 270 degrees clockwise from the downward orientation of the display screen 121a displayed on the LCD 121, that is, when the display screen 121a is rotated 90 degrees counterclockwise with respect to the LCD 121. The initial value of D1 set at the time of, for example, the start up of the information processing apparatus 100 is "0".

D2 is a value indicating a display orientation of the display screen 121a, most recently changed due to automatic rotation, expressed as an angle. D2 takes any one of values "−1", "0", "90", "180", and "270" degrees. While the initial value of D1 set at the time of, for example, the start up of the information processing apparatus 100 is "0", the initial value of D2 set at the time of, for example, the start up of the information processing apparatus 100 is "−1". With this, the condition where D2≠D1 is obtained in the initial state.

Although, in this embodiment, each of G1, D1, and D2 (except for the initial value) takes one of "0", "90", "180", and "270" degrees, each of the values may take a value representing an angle of arbitrarily divided intervals (for example, angles separated by 45 degrees).

FIG. 7 illustrates an application table according to the second embodiment. An application table 104a illustrated in FIG. 7 is created and managed by the control unit 101, and is stored in the HDD 113 which serves as the application information storage unit 104. The application table 104a is a table for storing application information which indicates whether to resume, at the closing of each application, automatic change of the display orientation of the display screen 121a performed by the control unit 101.

The application table 104a includes fields of "application name", "path", and "rotation resume flag". The application name field contains names for individually identifying corresponding applications. The path field contains locations of the corresponding applications in the information processing apparatus 100. The rotation resume flag field indicates whether to release, at the end of each of the corresponding applications, the temporary stop state of the display screen 121a so as to resume automatic change of the display orientation. The application information is configured, in which information of the individual fields laterally aligned is associated with each other.

Each entry under the application name field is information indicating a name uniquely identifying a corresponding application to be executed on the information processing apparatus 100.

Each entry under the path field is information indicating a location of a corresponding application.

Each entry under the rotation resume flag field is a flag indicating whether to resume, at the end of a corresponding application, automatic change of the display orientation of the display screen 121a. In the case where the information processing apparatus 100 releases the temporary stop state after the closing of a corresponding application, "TRUE" is set in the rotation resume flag. On the other hand, in the case where the information processing apparatus 100 makes a transition to a temporary stop state after the closing of a corresponding application, "FALSE" is set in the rotation resume flag.

FIGS. 8A to 10B illustrate a relationship between orientations of an information processing apparatus and display orientations of a display screen according to the second embodiment. Changes of the orientation of the information processing apparatus 100 and the display orientation of the display screen 121a are described in order of FIGS. 8A, 8B, 9A, 9B, 10A, and 10B.

In each of FIGS. 8A to 10B, a direction indicated by an arrow A is the rightward direction and a direction indicated by an arrow B is the vertical direction.

When used in a normal use state or tablet state, the information processing apparatus 100 changes the display orientation of the display screen 121a according to the orientation of the information processing apparatus 100, detected by the accelerometer sensor 117, or an operation performed by a user on the screen rotation button 122. This allows a user to use the LCD 121 in the vertical orientation or horizontal orientation. Although FIGS. 8 to 10 illustrate the information processing apparatus 100 in a tablet state by way of example, the same applies to the information processing apparatus 100 in a normal use state. In addition, according to this embodiment, a surface on which the LCD 121 is provided is referred to as a front surface 100a, and a side surface of the information processing apparatus 100, close to the screen rotation button 122, is referred to as a bottom surface 100b of the information processing apparatus 100 in a tablet state. In addition, the direction in which the bottom surface 100b exists as viewed from the center of the LCD 121 is the downward orientation of the LCD 121.

Figure 8A:
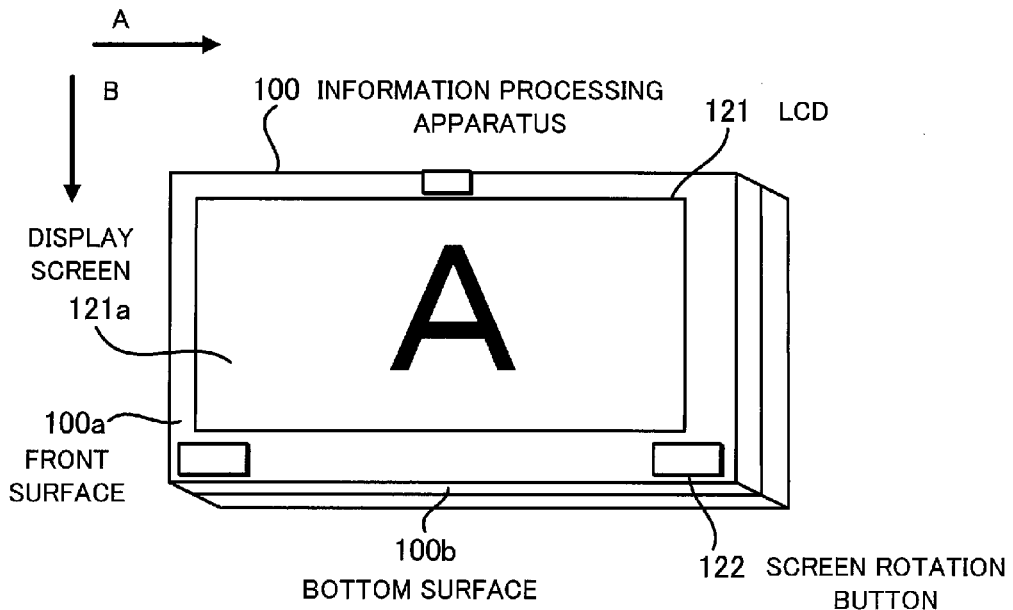
FIGS. 8A and 8B illustrate relationships between orientations of the information processing apparatus and display orientations of a display screen according to the second embodiment.

FIG. 8A illustrates the information processing apparatus 100 disposed in such a manner that the downward orientation of the LCD 121 coincides with the projection direction to the LCD 121, which is the vertical direction indicated by the arrow B (G1=0). The downward side of the display orientation of the display screen 121a on which a letter of "A", given as an example, is displayed coincides with the downward orientation of the LCD 121 (D1=0). Assume at this time that the information processing apparatus 100 is in a temporary stop released state.

Figure 8B:
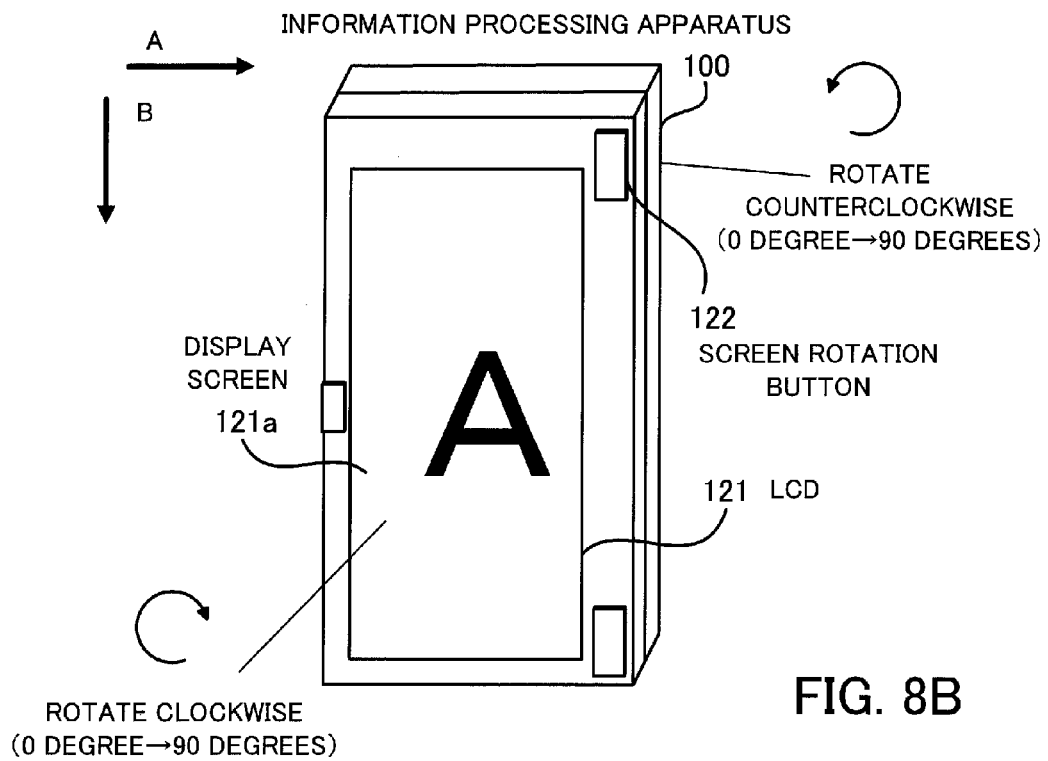

FIG. 8B illustrates the information processing apparatus 100 disposed in such a manner as to be rotated from the disposition illustrated in FIG. 8A. Here, the downward orientation of the LCD 121 is rotated 90 degrees counterclockwise from the projection direction to the LCD 121, which is the vertical direction indicated by the arrow B (G1=90). At this point, due to automatic change of the display orientation of the information processing apparatus 100 which is out of a temporary stop state, the display orientation of the display screen 121a is changed from the condition illustrated in FIG. 8A, being rotated 90 degrees clockwise from the downward orientation of the LCD 121 (D1=90). In addition, at this point, D2 indicating the previous latest display orientation is set to "90" which is the display orientation of the display screen 121a changed by the control unit 101 this time.

Figure 9A:
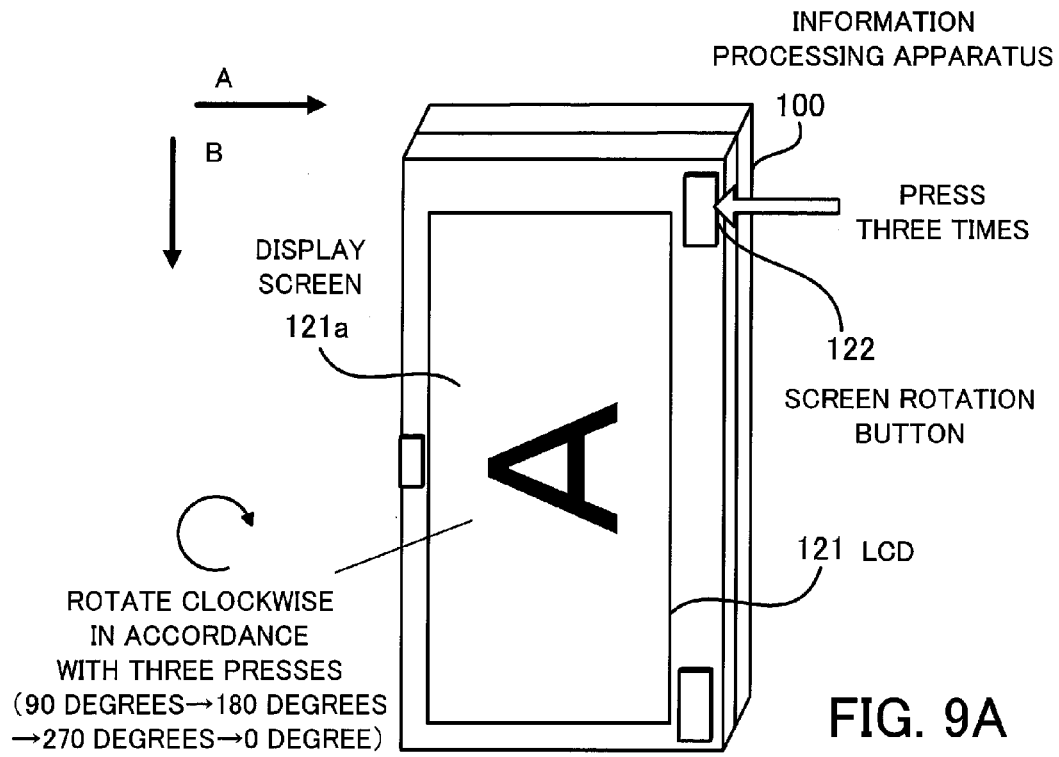
FIGS. 9A and 9B illustrate relationships between orientations of the information processing apparatus and display orientations of the display screen according to the second embodiment.

Similar to FIG. 8B, FIG. 9A illustrates the information processing apparatus 100 disposed in such a manner that the downward orientation of the LCD 121 is rotated 90 degrees counterclockwise from the projection direction to the LCD 121, which is the vertical direction indicated by the arrow B (G1=90). However, due to a user operation on the screen rotation button 122, the orientation of the display screen 121a has been changed from the condition of FIG. 8B, coinciding with the downward orientation of the LCD 121 (D1=0).

At this point, a user is able to rotate the display orientation of the display screen 121a by 90 degrees by pressing the screen rotation button 122 once to increase D1 of the control information to "90". Note that if D1 becomes "360" as a result of the user pressing the screen rotation button 122, D1 is corrected to be "0". With this, the user is able to adjust the display screen 121a to a desired angle by pressing the screen rotation button 122 multiple times until the display screen 121a is set at the desired angle.

Although the details are described later in a screen display orientation control process with reference to FIG. 11, the information processing apparatus 100 makes a transition to a temporary stop state at this point because D1, which is an angle indicating the latest display orientation of the display screen 121a, is different from D2 indicating the previous latest display orientation illustrated in FIG. 8B (D1=0≠D2=90).

Figure 9B:
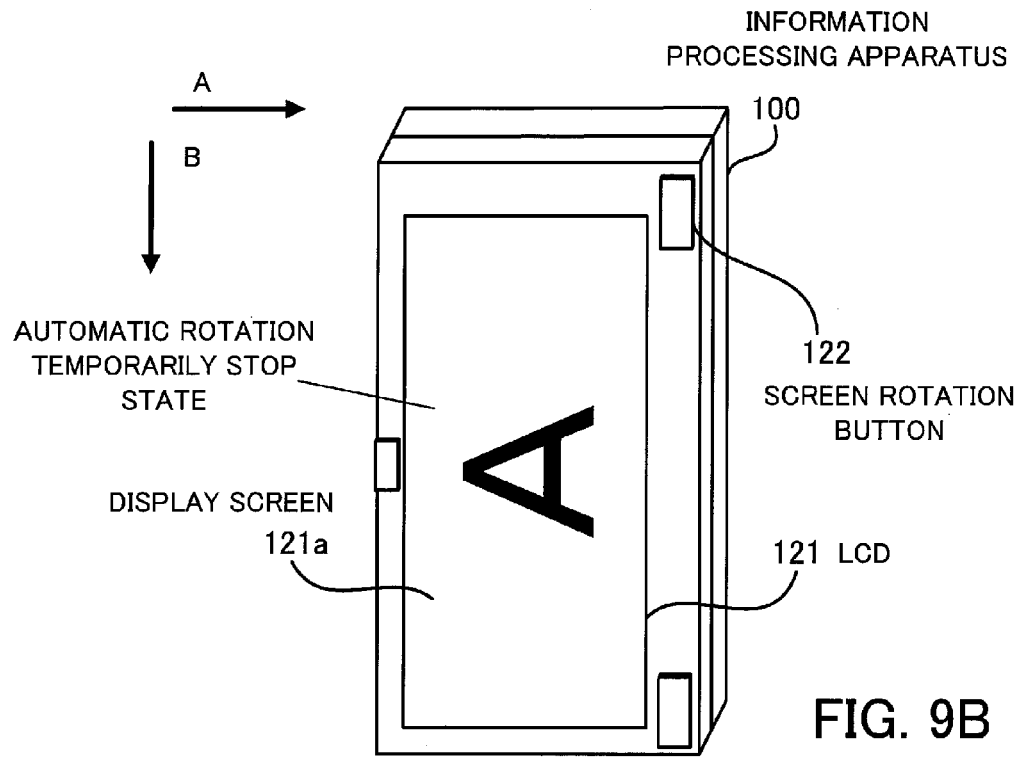

The orientation of the information processing apparatus 100 in FIG. 9B is the same as that of FIG. 9A. Since the information processing apparatus 100 enters a temporary stop state in FIG. 9A, automatic change of the display orientation of the display screen 121a is not performed and, therefore, D1 indicating the display orientation of the display screen 121a is the same as that of FIG. 9A (D1=0).

Figure 10A:
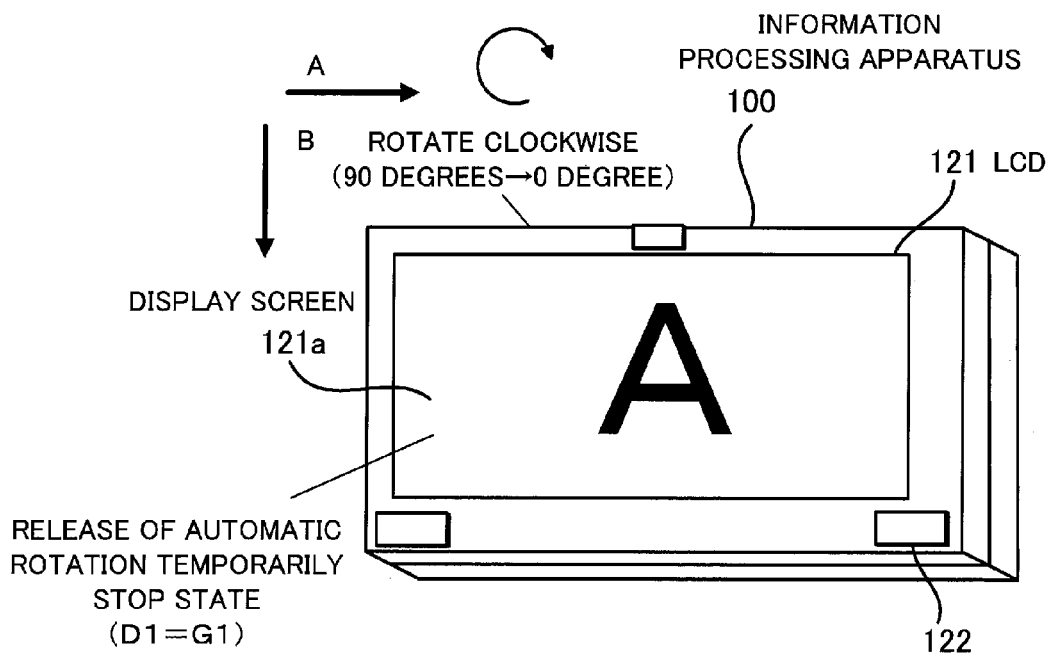
FIGS. 10A and 10B illustrate relationships between orientations of the information processing apparatus and display orientations of the display screen according to the second embodiment.

FIG. 10A illustrates the information processing apparatus 100 disposed in such a manner as to be rotated from the disposition of FIG. 9B. Here, the downward orientation of the LCD 121 coincides with the projection direction to the LCD 121, which is the vertical direction indicated by the arrow B (G1=0). Since the information processing apparatus 100 enters a temporary stop state in FIG. 9A, automatic change of the display orientation of the display screen 121a is not performed at this time and, therefore, D1 indicating the display orientation of the display screen 121a is the same as that of FIG. 9A (D1=0). With this, the information processing apparatus 100 releases the temporary stop state at this point since D1 indicating the display orientation of the display screen 121a coincides with the orientation of the information processing apparatus 100 (D1=G1=0) although the details are described later in the screen display orientation control process with reference to FIG. 11.

Figure 10B:
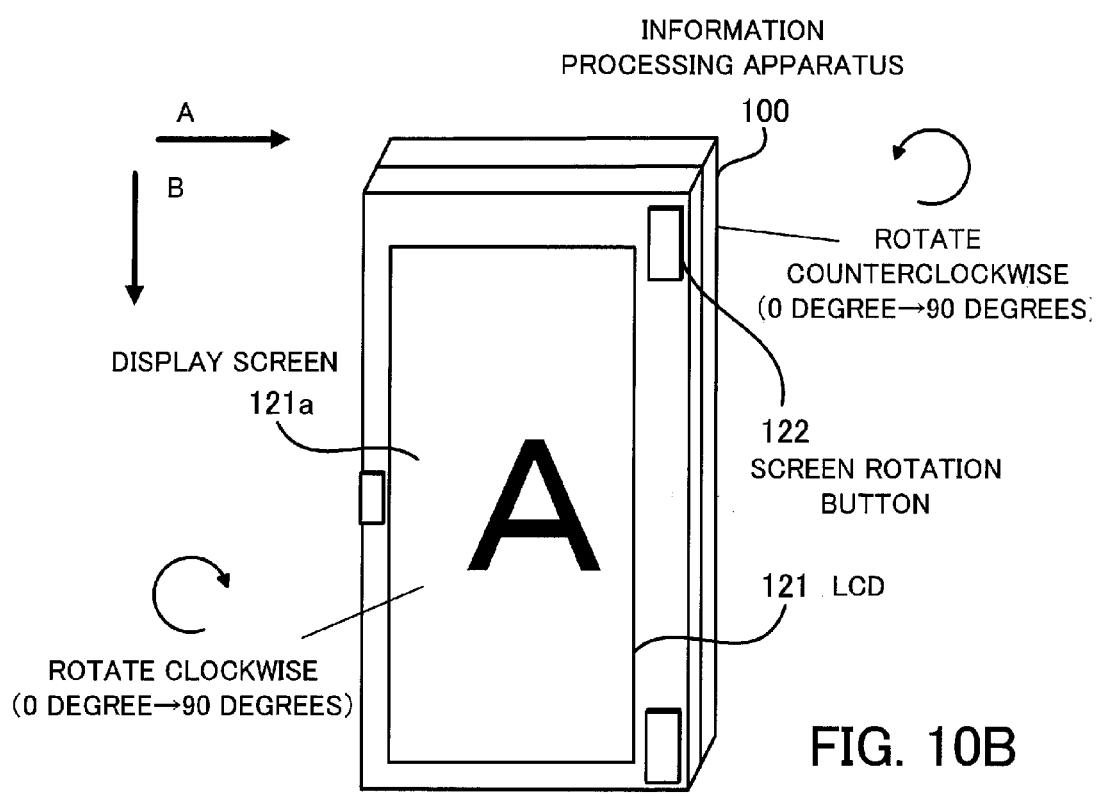

FIG. 10B illustrates the information processing apparatus 100 disposed in such a manner as to be rotated from the disposition of FIG. 10A. Here, the downward orientation of the LCD 121 is rotated 90 degrees counterclockwise from the projection direction to the LCD 121, which is the vertical direction indicated by the arrow B (G1=90). At this point, since the information processing apparatus 100 releases the temporary stop state in FIG. 10A, automatic change of the display orientation is performed in such a manner that the orientation of the display screen 121a is changed from the condition illustrated in FIG. 10A, being rotated 90 degrees clockwise from the downward orientation of the LCD 121 (D1=90).

As described above, when the orientation of the LCD 121 coincides with the orientation of the display screen 121a as illustrated in FIG. 9A, the information processing apparatus 100 enters a temporary stop state in which automatic rotation of the display screen 121a is not performed by the control unit 101 even if the information processing apparatus 100 rotates. In addition, when the rotation angle of the LCD 121 coincides with the display screen rotation angle of the display screen 121a (that is, the vertical direction coincides with the downward orientation of the display screen 121a), the information processing apparatus 100 releases the temporary stop state and activates automatic rotation of the display screen 121a again.

Figure 11:
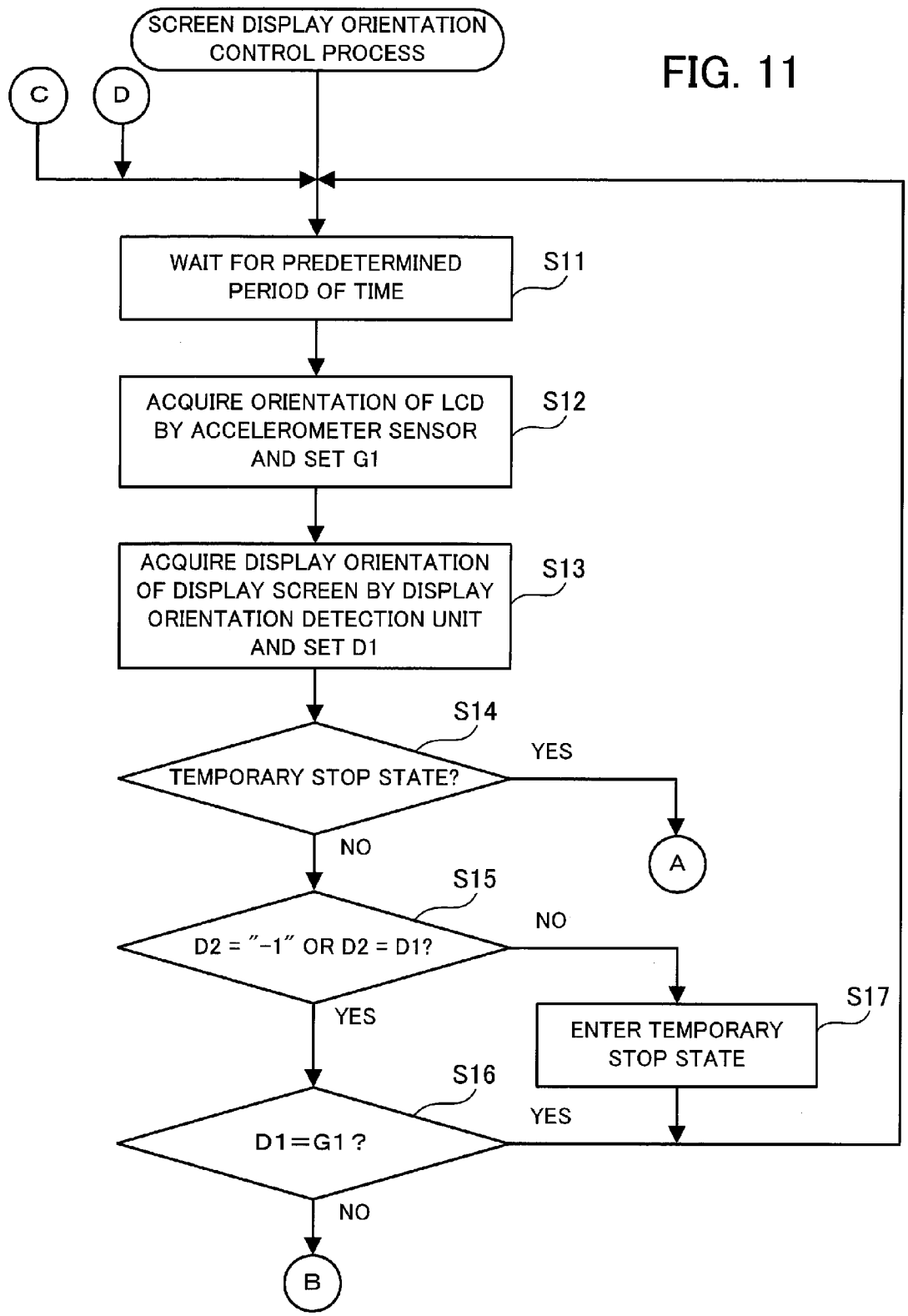
FIG. 11 is a flowchart illustrating a procedure of a screen display orientation control process according to the second embodiment.
Figure 12:
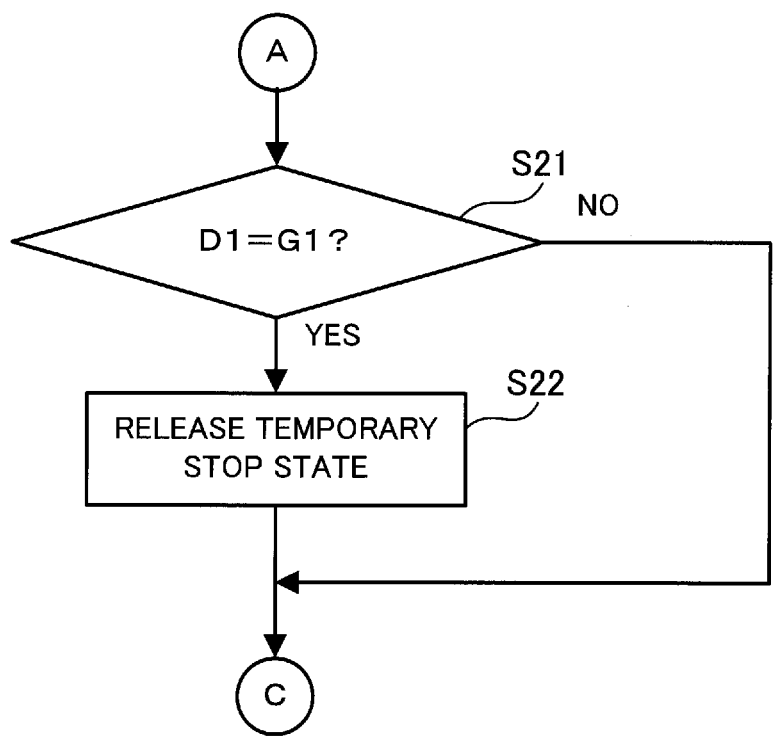
FIG. 12 is a flowchart illustrating the procedure of the screen display orientation control process according to the second embodiment.
Figure 13:
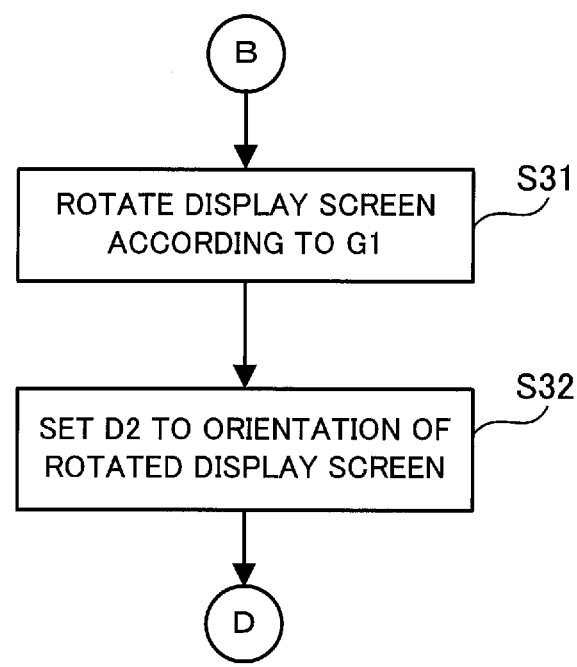
FIG. 13 is a flowchart illustrating the procedure of the screen display orientation control process according to the second embodiment.

FIGS. 11 to 13 are flowcharts illustrating a procedure of a screen display orientation control process according to the second embodiment. By the screen display orientation control process, the information processing apparatus 100 of this embodiment controls the display orientation of the display screen 121a based on the orientation of the LCD 121 of the information processing apparatus 100. In this embodiment, while the display screen 121a is displayed on the LCD 121 by the information processing apparatus 100, the screen display orientation control process is executed. The screen display orientation control process is described next.

[Step S11] The control unit 101 waits for a predetermined period of time (for example, 1 second). With this, an operation of acquiring the orientation of the LCD 121 of the information processing apparatus 100 and acquiring the display orientation of the display screen 121a is performed at constant intervals.

[Step S12] The control unit 101 causes the accelerometer sensor 117 to detect the orientation of the LCD 121 and acquires the detected orientation of the LCD 121. Then, according to the acquired orientation of the LCD 121, the control unit 101 sets G1 indicating the tilt direction of the LCD 121, stored in the control information storage unit 103.

[Step S13] The control unit 101 causes the display orientation detection unit 102 to detect the latest display orientation of the display screen 121a and acquires the detected display orientation of the display screen 121a. Then, according to the acquired orientation of the display screen 121a, the control unit 101 sets D1 indicating the latest display orientation of the display screen 121a, stored in the control information storage unit 103.

[Step S14] The control unit 101 determines whether the information processing apparatus 100 is in a temporary stop state by referring to the temporary stop state flag indicating a temporary stop state or not, stored in the RAM 112. If the information processing apparatus 100 is in a temporary stop state, the control unit 101 proceeds to step S21 (FIG. 12). On the other hand, if the information processing apparatus 100 is not in a temporary stop state, the control unit 101 proceeds to step S15. When the information processing apparatus 100 is in a temporary stop state, the temporary stop state flag is set to a value indicating being enabled (for example, "1"). When the information processing apparatus 100 is not in a temporary stop state, the temporary stop state flag is set to a value indicating being disabled (for example, "0"). In this embodiment, the temporary stop state flag is set to the value indicating being disabled in the initial state. Instead, the temporary stop state flag may be set to the value indicating being enabled in the initial state.

[Step S15] The control unit 101 determines whether at least one of the following is true: D2 indicating the previous latest display orientation is "−1"; and D2 and D1 are equal to each other. At least one of the two is true, the control unit 101 proceeds to step S16. On the other hand, neither of the two are true, the control unit 101 proceeds to step S17.

[Step S16] The control unit 101 determines whether D1 and G1 are equal to each other. If D1 and G1 are equal to each other, the control unit 101 proceeds to step S11. On the other hand, if D1 and G1 are not equal to each other, the control unit 101 proceeds to step S31 (FIG. 13).

[Step S17] The control unit 101 sets the temporary stop state flag to the value indicating being enabled so that the information processing apparatus 100 enters a temporary stop state.

[Step S21] The control unit 101 determines whether D1 and G1 are equal to each other. If D1 and G1 are equal to each other, the control unit 101 proceeds to step S22. On the other hand, if D1 and G1 are not equal to each other, the control unit 101 proceeds to step S11.

[Step S22] The control unit 101 sets the temporary stop state flag to the value indicating being disabled so that the information processing apparatus 100 releases the temporary stop state. Subsequently, the control unit 101 proceeds to step S11.

[Step S31] According to G1 indicating the tilt direction of the LCD 121, the control unit 101 rotates the display screen 121a in such a manner that the downward orientation of the display screen 121a coincides with the vertical downward direction.

At this point, if G1 indicating the tilt direction of the LCD 121 is "0" (the downward orientation of the LCD 121 coincides with the vertical downward direction), the control unit 101 rotates the display screen 121a in such a manner that D1="0" is obtained, that is, the downward orientation of the display screen 121a coincides with the downward orientation of the LCD 121. In addition, if G1 is "90" (the downward orientation of the LCD 121 coincides with the rightward direction to a user facing the LCD 121), the control unit 101 rotates the display screen 121a in such a manner that D1="90" is obtained, that is, the downward orientation of the display screen 121a coincides with the leftward direction of the LCD 121. In addition, if G1 is "180" (the downward orientation of the LCD 121 coincides with the vertical upward direction), the control unit 101 rotates the display screen 121a in such a manner that D1="180" is obtained, that is, the downward orientation of the display screen 121a coincides with the upward direction of the LCD 121. In addition, if G1 is "270" (the downward orientation of the LCD 121 coincides with the leftward direction to a user facing the LCD 121), the control unit 101 rotates the display screen 121a in such a manner that D1="270" is obtained, that is, the downward orientation of the display screen 121a coincides with the rightward direction of the LCD 121.

[Step S32] According to the display orientation of the display screen 121a rotated in step S31, the control unit 101 sets D2 stored in the control information storage unit 103. Subsequently, the control unit 101 proceeds to step S11.

Figure 14:
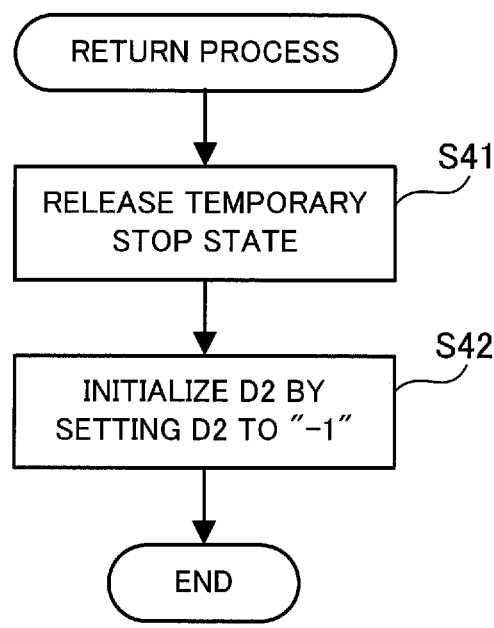
FIG. 14 is a flowchart illustrating a procedure of a return process according to the second embodiment.

FIG. 14 is a flowchart illustrating a procedure of a return process according to the second embodiment. The information processing apparatus 100 of this embodiment executes the return process in order to initialize the setting for automatic change of the display orientation of the information processing apparatus 100 when the information processing apparatus 100 returns from a power-saving mode, when a user previously being in a logoff state has logged in, or when a user switch is performed. By executing the return process, the information processing apparatus 100 is able to initialize the temporary stop state flag and D2 after return from a power-saving mode, user login, or user switch. Accordingly, the information processing apparatus 100 is able to properly execute the screen display orientation control process. The return process is described next.

[Step S41] The control unit 101 sets the temporary stop state flag stored in the RAM 112 to the value indicating being disabled, to thereby release the temporary stop state.

[Step S42] The control unit 101 initializes D2 stored in the control information storage unit 103 by setting D2 to "−1". Subsequently, the control unit 101 ends the process. With this, in the information processing apparatus 100, the screen display orientation control process is executed based on the temporary stop state flag and D2 initialized by the return process.

Figure 15:
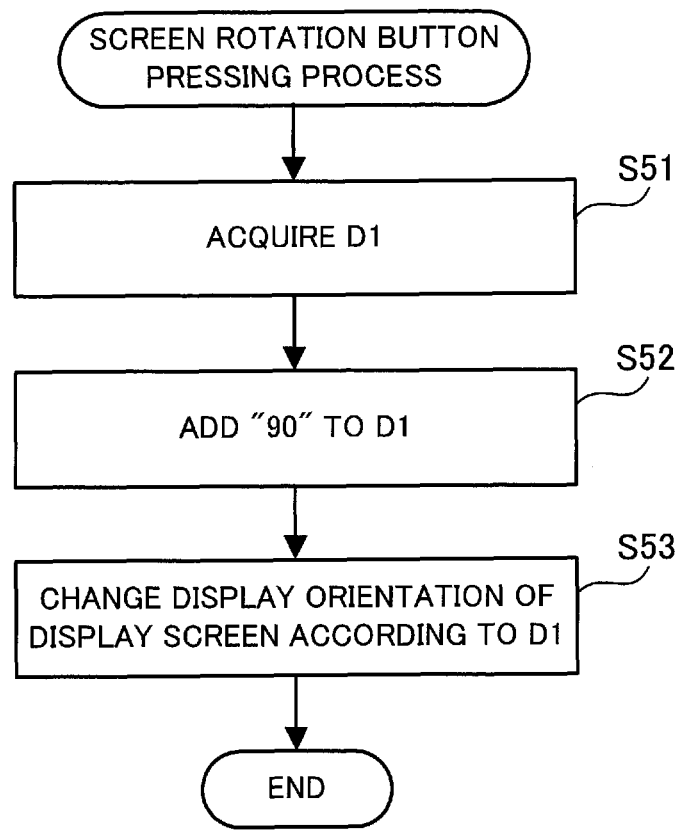
FIG. 15 is a flowchart illustrating a procedure of a screen rotation button pressing process according to the second embodiment.

FIG. 15 is a flowchart illustrating a procedure of a screen rotation button pressing process according to the second embodiment. When detecting an operation for changing the display orientation, which operation is a press on the screen rotation button 122 for changing the display orientation of the display screen 121a, the information processing apparatus 100 of this embodiment executes the screen rotation button pressing process. By executing the screen rotation button pressing process, the information processing apparatus 100 is able to change the display orientation of the display screen 121a to a display orientation desired by the user. The screen rotation button pressing process is described next.

[Step S51] The control unit 101 acquires D1 from the control information storage unit 103.

[Step S52] The control unit 101 sets D1 to a value obtained by adding "90" to D1 acquired in step S51.

[Step S53] The control unit 101 changes the display orientation of the display screen 121a according to D1 set in step S52. Subsequently, the control unit 101 ends the process. With this, the display orientation of the display screen 121a is rotated 90 degrees clockwise. A user is able to change the display orientation of the display screen 121a to a desired orientation by repeatedly pressing the screen rotation button 122 until the display orientation of the display screen 121a is set in a desired orientation.

According to this embodiment, the display orientation of the display screen 121a is rotated 90 degrees clockwise according to a press on the screen rotation button 122 performed by a user. Instead, the display orientation of the display screen 121a may be rotated by arbitrary angles, for example, 45 degrees. In addition, the display orientation of the display screen 121a may be rotated counterclockwise according to a press on the screen rotation button 122 performed by a user. Alternatively, a user may input a direct designation of a desired display orientation of the display screen 121a (for example, "1" is input to designate the upward orientation). In this case, the information processing apparatus 100 receives the designation of the display orientation input by the user, and displays the display screen 121a in the received display orientation. Further, the information processing apparatus 100 may have an input device, such as multiple directional buttons, for directly receiving a designation of a display orientation of the display screen 121a from a user. In addition, the information processing apparatus 100 may display, on the display screen 121a, an icon or an input window for directly receiving a designation of a display orientation of the display screen 121a from a user. The icon and input window allow selection of multiple orientations to be input.

Figure 16:
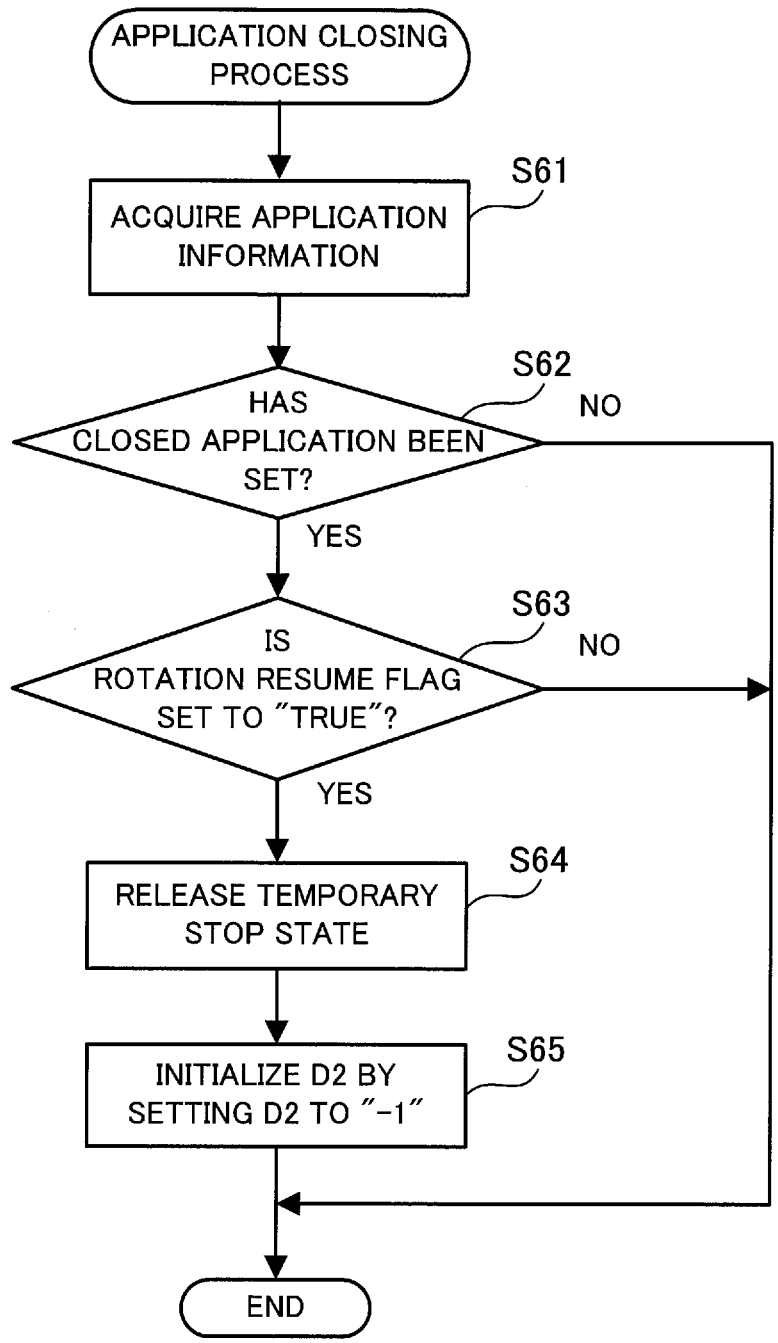
FIG. 16 is a flowchart illustrating a procedure of an application closing process according to the second embodiment.

FIG. 16 is a flowchart illustrating a procedure of an application closing process according to the second embodiment. Among applications to be executed on the information processing apparatus 100, such as applications for displaying videos and still images, some support only a definite orientation and are not appropriate for changing the display orientation of the display screen 121a because they are designed with no intention of changing the display orientation. For such an application, change of the display orientation of the display screen 121a needs to be limited during the execution of the application. At the closing of an application in which change of the display orientation of the display screen 121a is restricted, the information processing apparatus 100 of this embodiment executes the application closing process. By executing the application closing process, the information processing apparatus 100 is able to initialize the temporary stop state flag and D2 after the closing of the application in which change of the display orientation is restricted. Accordingly, the information processing apparatus 100 is able to properly execute the screen display orientation control process. The application closing process is described next.

[Step S61] The control unit 101 acquires application information from the application information storage unit 104.

[Step S62] By referring to the application information acquired in step S61, the control unit 101 determines whether a closed application has been set in the application information. If the closed application has been set in the application information, the control unit 101 proceeds to step S63. On the other hand, if the closed application has not been set in the application information, the control unit 101 ends the process.

[Step S63] By referring to the application information acquired in step S61, the control unit 101 determines whether the rotation resume flag of the closed application is set to "TRUE". If the rotation resume flag is set to "TRUE", the control unit 101 proceeds to step S64. On the other hand, if the rotation resume flag is set to "FALSE", the control unit 101 ends the process.

[Step S64] The control unit 101 disables the temporary stop state flag stored in the RAM 112 by assigning thereto the value indicating being disabled, to thereby release the temporary stop state.

[Step S65] The control unit 101 initializes D2 stored in the control information storage unit 103 by setting D2 to "−1". Subsequently, the control unit 101 ends the process. With this, in the information processing apparatus 100, the screen display orientation control process is executed based on the temporary stop state flag and D2 initialized by the application closing process.

Figure 17:
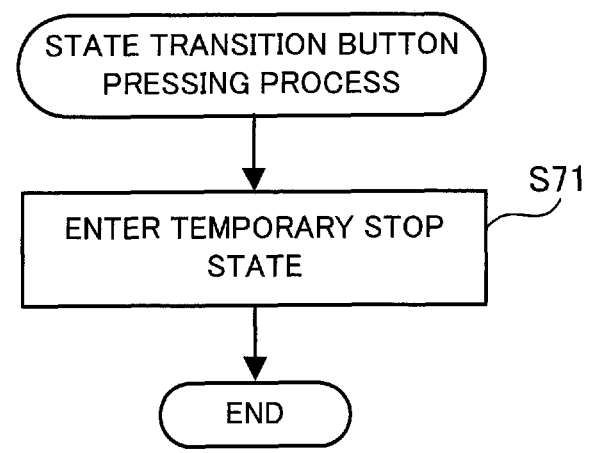
FIG. 17 is a flowchart illustrating a procedure of a state transition button pressing process according to the second embodiment.

FIG. 17 is a flowchart illustrating a procedure of a state transition button pressing process according to the second embodiment. The information processing apparatus 100 of this embodiment executes the state transition button pressing process when detecting an operation for making a transition to a temporary stop state, which operation is a press on the state transition button 123. By executing the state transition button pressing process, the information processing apparatus 100 enters a temporary stop state in which the display orientation of the display screen 121a, detected by the accelerometer sensor 117, is not changed according to the tilt direction of the LCD 121. The state transition button pressing process is described next.

[Step S71] The control unit 101 makes a transition to a temporary stop state by enabling the temporary stop state flag. Subsequently, the control unit 101 ends the process. With this, if a user does not want the display orientation of the display screen 121a to be automatically rotated at the time when the temporary stop state has been released, the user presses the state transition button 123 so that the information processing apparatus 100 enters a temporary stop state. In this manner, the user is able to temporarily stop the automatic rotation function.

According to this embodiment, when being not in a temporary stop state, the information processing apparatus 100 enters a temporary stop state in response to a press on the state transition button 123 performed by a user. Instead, when being in a temporary stop state, the information processing apparatus 100 may release the temporary stop state in response to a press on the state transition button 123 performed by a user. In addition, when being in a temporary stop state, the information processing apparatus 100 may release the temporary stop state at the same time or separately from change of the display orientation, in response to a press on the screen rotation button 122 performed by a user.

According to this embodiment, the accelerometer sensor 117 is provided in the display unit 120 in order to detect the tilt direction of the LCD 121, and the display orientation of the display screen 121a is changed based on the detected tilt direction of the LCD 121. Instead, the accelerometer sensor 117 may be provided in a different part of the information processing apparatus 100, such as the main body unit 130, and the display orientation of the display screen 121a may be changed based on the tilt direction of the information processing apparatus 100.

As described above, according to the second embodiment, the control unit 101 makes a transition to a temporary stop state so as to temporarily stop automatic change of the display orientation in the case where the display orientation of the display screen 121a is different from a display orientation automatically changed based on detection of the orientation of the information processing apparatus 100. With this, when a user or an application changes the display orientation of the display screen 121a, automatic change of the display orientation is not performed and change of the display orientation made by the user, or an application, takes priority. Accordingly, it is possible to adequately control enabling and disabling of the function of automatically changing the display orientation of the display screen 121a.

In addition, when the display orientation of the display screen 121a coincides with the vertical downward direction, the control unit 101 releases the temporary stop state so as to automatically change the display orientation of the display screen 121a. Accordingly, in the case where a user spontaneously rotates the information processing apparatus 100 to make the display orientation of the display screen 121a coincide with the vertical downward direction in order to align the downward orientation of the display screen 121a in the vertical downward direction, it is possible to cancel the priority of the display orientation changed by the user or an application and resume the temporarily stopped automatic change of the display orientation of the display screen 121a.

When the display orientation of the display screen 121a coincides with the vertical downward direction, the control unit 101 releases the temporary stop state so as to automatically change the display orientation of the display screen 121a. Accordingly, in the case where a user wants to intentionally resume automatic change of the display orientation, the LCD 121 of the information processing apparatus 100 is rotated in such a manner that the display orientation of the display screen 121a coincides with the vertical downward direction. As a result, it is possible to cancel the priority of the display orientation changed by the user or an application and resume the temporarily stopped automatic change of the display orientation of the display screen 121a.

In addition, the control unit 101 rotates the display orientation of the display screen 121a 90 degrees clockwise according to a press on the screen rotation button 122 performed by a user. With this, the user is able to change the display orientation of the display screen 121a to a desired angle by repeatedly pressing the screen rotation button 122 until the display angle of the display screen 121a is set at the desired angle.

In addition, the control unit 101 disables the temporary stop state flag at the closing of an application when a corresponding rotation resume flag included in the application information is enabled. With this, even if an application is used which automatically enables the temporary stop state flag in order to stop automatic change of the display orientation of the display screen 121a, it is possible to resume automatic change of the display orientation of the display screen 121a after the closing of the application.

In addition, the control unit 101 disables the temporary stop state flag when the information processing apparatus 100 returns from a power-saving mode, when a transition is made from logoff mode to logon mode, or when a user switch is performed. With this, automatic change of the display orientation of the display screen 121a is resumed in the case where automatic change of the display orientation of the display screen 121a has been temporarily stopped, for example, during application execution, during operation in power-saving mode, during logoff, or during use by another user.

In addition, the control unit 101 makes a transition to a temporary stop state to temporarily stop automatic change of the display orientation in the case where a user operates the state transition button 123 when a temporary stop state has been released. With this, when the user does not want automatic change of the display orientation, automatic change of the display orientation is not performed and change of the display orientation made by the user, or an application, takes priority. Accordingly, it is possible to adequately control enabling and disabling of the function of automatically changing the display orientation of the display screen 121a.

Third Embodiment

Next described is a third embodiment. The following description focuses on differences from the above-described second embodiment. The same reference numerals are given to the components which are common to those in the second embodiment, and their explanations are omitted herein.

According to the third embodiment, a threshold for determining whether to change the display orientation is set. Then, when the tilt angle of the display unit exceeds the threshold a predetermined number of times within a predetermined period of time, the temporary stop state is released. The third embodiment is different from the second embodiment in this regard.

Figure 18:
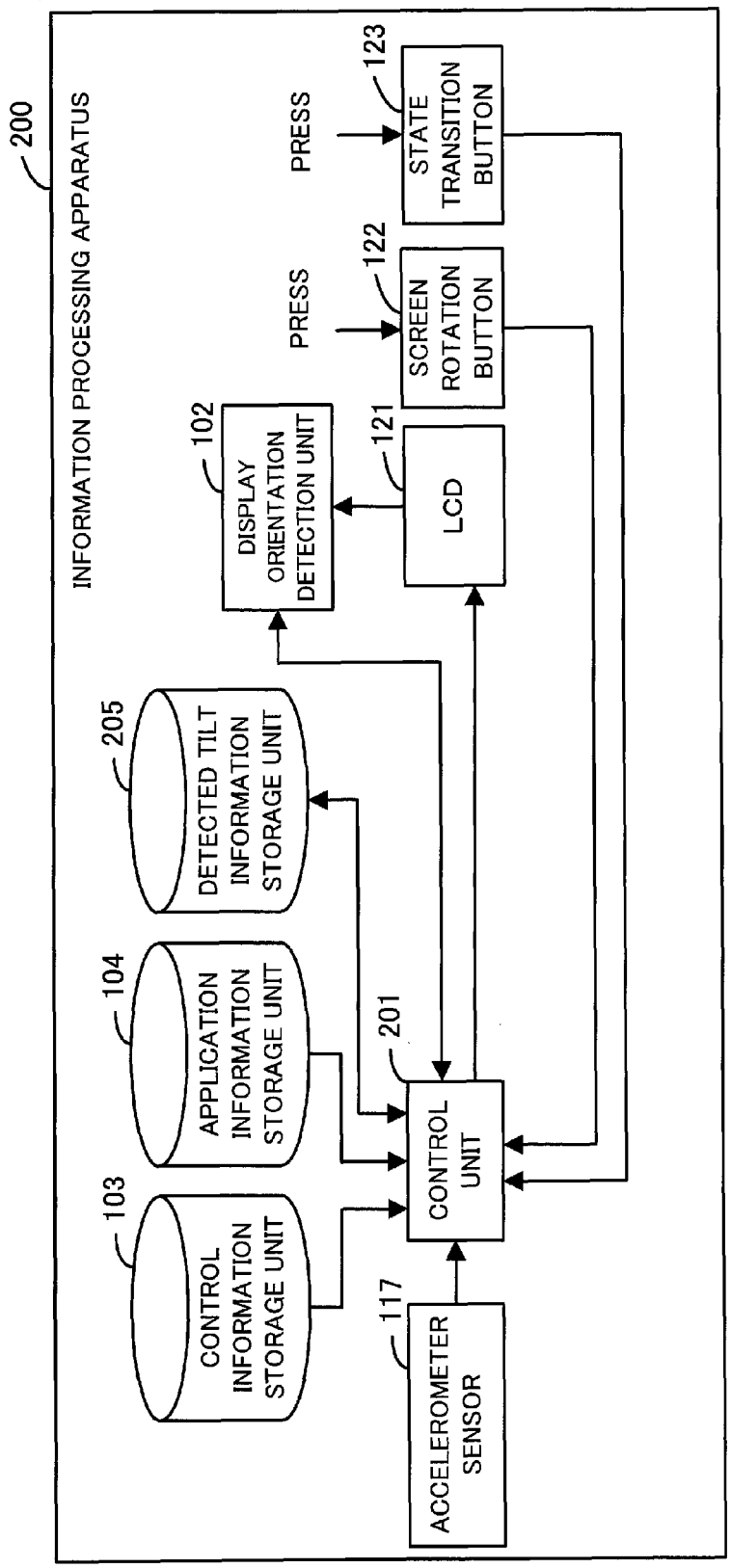
FIG. 18 is a block diagram of an information processing apparatus according to a third embodiment.

FIG. 18 is a block diagram of an information processing apparatus according to the third embodiment. An information processing apparatus 200 of FIG. 18 has a function of displaying an image. The information processing apparatus 200 includes a control unit 201, the display orientation detection unit 102, the control information storage unit 103, the application information storage unit 104, a detected tilt information storage unit 205, the accelerometer sensor 117, the LCD 121, the screen rotation button 122, and the state transition button 123.

In a temporary stop state where the display orientation of the display screen 121a, detected by the display orientation detection unit 102, is not changed according to the tilt direction of the LCD 121, the control unit 201 changes the display orientation of the display screen 121a according to the tilt direction of the LCD 121 if the display orientation of the display screen 121a, detected by the display orientation detection unit 102, coincides with, among orientations in which the display screen 121a is allowed to be displayed, an orientation closest to a vertical downward direction.

More specifically, the control unit 201 uses the vertical downward direction as the base, i.e., ±0 degree, and a counterclockwise rotation from the vertical downward direction is represented by a + (positive) angle in degrees and a clockwise rotation from the vertical downward direction is represented by a − (negative) angle in degrees. In this condition, when the angle of LCD 121 detected by the accelerometer sensor 117 falls within the range of −44 (+316) to +45 degrees, the control unit 201 determines that the angle of the LCD 121 is 0 degree. Similarly, when the angle of the LCD 121 detected by the accelerometer sensor 117 falls within the range of +46 to +135 degrees, the control unit 201 determines that the angle of the LCD 121 is 90 degrees. When the angle of the LCD 121 detected by the accelerometer sensor 117 falls within the range of +136 to −135 (+225) degrees, the control unit 201 determines that the angle of the LCD 121 is 180 degrees. When the angle of the LCD 121 detected by the accelerometer sensor 117 falls within the range of −134 (+226) to −45 (+315) degrees, the control unit 201 determines that the angle of the LCD 121 is 270 degrees.

In addition, when the display orientation of the display screen 121a, detected by the display orientation detection unit 102, does not coincide with a previous latest display orientation which is a display orientation most recently changed according to the tilt direction of the LCD 121, the control unit 201 enables a temporary stop state flag to make a transition to a temporary stop state. Here, the temporary stop state flag is a flag indicating a temporary stop state or not. The temporary stop state flag is enabled in order to set a temporary stop state, and disabled in order to release the temporary stop state. The temporary stop state flag is stored in the RAM 112. With this, when the display orientation of the display screen 121a is different from the previous latest display orientation before the automatic change, automatic change of the display orientation is temporarily stopped.

Here, even when a temporary stop state has been set, it is possible to change the display orientation of the display screen 121a by a user operation or an application. In addition, the previous latest display orientation is a display orientation of the display screen 121a, most recently changed by the control unit 201 according to the tilt direction of the LCD 121. That is, the display orientation of the display screen 121a, changed by a user operation or an application, is not referred to as the previous latest display orientation. In the case where the display orientation of the display screen 121a is changed by a user operation or an application, the previous latest display orientation is not updated. With this, in the case of changing the display orientation of the display screen 121a from the previous latest display orientation, that is, in the case where the display orientation is changed, not by the control unit 201 according to the tilt direction of the LCD 121, but by a user or an application, it is possible to temporarily stop automatic change to be made by the control unit 201 and maintain the display orientation changed by the user or the application.

In addition, during a temporary stop state which is set by enabling the temporary stop state flag, the control unit 201 does not change the display orientation of the display screen 121a. On the other hand, if the display orientation of the display screen 1d1, detected by the display orientation detection unit 102, is not a predetermined orientation during a non-temporary stop state which is set by disabling the temporary stop state flag, the control unit 201 changes the display orientation of the display screen 121a according to the tilt direction of the LCD 121 and also sets the changed display orientation of the display screen 121a as the previous latest display orientation. Here, the predetermined orientation concerning the display orientation of the display screen 121a may be, for example, the vertical downward direction or a preset orientation desired by a user.

At this point, if the downward orientation of the LCD 121 coincides with the vertical downward direction, the control unit 201 rotates the display screen 121a in such a manner that the downward orientation of the display screen 121a coincides with the downward orientation of the LCD 121. In addition, if the downward orientation of the LCD 121 coincides with the rightward direction to a user facing the LCD 121, the control unit 201 rotates the display screen 121a in such a manner that the downward orientation of the display screen 121a coincides with the leftward orientation of the LCD 121. In addition, if the downward orientation of the LCD 121 coincides with the vertical upward direction, the control unit 201 rotates the display screen 121a in such a manner that the downward orientation of the display screen 121a coincides with the upward orientation of the LCD 121. Further, if the downward orientation of the LCD 121 coincides with the leftward direction to a user facing the LCD 121, the control unit 201 rotates the display screen 121a in such a manner that the downward orientation of the display screen 121a coincides with the rightward orientation of the LCD 121. Thus, in the operation of automatically changing the display orientation of the display screen 121a, the control unit 201 rotates the display orientation of the display screen 121a according to the tilt direction of the LCD 121 in such a manner that the downward orientation of the display screen 121a coincides with the vertical downward direction. In this way, the control unit 201 controls the display orientation of the display screen 121a easier for a user to view the display screen 121a.

In addition, when the display orientation of the display screen 121a, detected by the display orientation detection unit 102, coincides with the tilt direction of the LCD 121, detected by the accelerometer sensor 117, the control unit 201 disables the temporary stop state flag to thereby release the temporary stop state. With this, when the display orientation of the display screen 121a coincides with the tilt direction of the LCD 121, the display orientation of the display screen 121a is set to be automatically changed.

In addition, when the screen rotation button 122 receives a press operation (display orientation change operation) performed thereon by a user, the control unit 201 rotates the display orientation of the display screen 121a 90 degrees clockwise in response to the press. With this, the user is able to change the display orientation of the display screen 121a to a desired angle by repeatedly pressing the screen rotation button 122 until the display angle of the display screen 121a is set at the desired angle.

In addition, in the case where a rotation resume flag held by application information is enabled, the control unit 201 disables the temporary stop state flag when closing a corresponding application. In addition, the control unit 201 disables the temporary stop state flag when the information processing apparatus 200 returns from a power-saving mode, when a transition is made from logoff mode to logon mode, or when a user switch is performed. With this, automatic change of the display orientation of the display screen 121a is resumed in the case where automatic change of the display orientation of the display screen 121a has been temporarily stopped, for example, during application execution, during operation in power-saving mode, during logoff, or during the use by another user.

In addition, according to an instruction of an application operating on the information processing apparatus 200, the control unit 201 changes the display orientation of the display screen 121a. Applications which cause the display orientation of the display screen 121a to be changed include various types of applications which cause the display orientation of the display screen 121a to be changed, for example, at the time when an operation screen or other information is displayed on the display screen 121a. Applications which display, on the display screen 121a, information such as text information and image information including a video and a still image, and music reproduction applications are examples of such application.

In addition, if it is determined based on detected tilt information stored in the detected tilt information storage unit 205 that the tilt angle does not exceed a predetermined threshold within a predetermined period of time (for example, three seconds), the control unit 201 makes a transition to a state where the display orientation of the display screen 121a is not changed according to the tilt direction of the LCD 121. Here, the case in which the tilt angle does not exceed a predetermined threshold a predetermined number of times or more within a predetermined period of time is, for example, that the tilt angle is maintained within a predetermined range (a range of angles according to a current tilt of the LCD 121, for example, −44 (+316) to +45 degrees when the current tilt of the LCD 121 is 0 degree).

In addition, the control unit 201 stores detected tilt information indicating a tilt angle of the LCD 121, detected by the accelerometer sensor 117, in the detected tilt information storage unit 205. If it is determined based on the detected tilt information stored in the detected tilt information storage unit 205 that the tilt angle exceeds a predetermined threshold a predetermined number of times (for example, twice) or more within a predetermined period of time (for example, three seconds), the control unit 201 makes a transition to a state where the display orientation of the display screen 121a is changed according to the tilt direction of the LCD 121. Here, the case in which the tilt angle exceeds a predetermined threshold a predetermined number of times or more within a predetermined period of time is, for example, that the tilt angle falls out of a predetermined range (a range of angles according to a current tilt of the LCD 121, for example, −44 (+316) to +45 degrees when the current tilt of the LCD 121 is 0 degree) the predetermined number of times or more within the predetermined period of time.

Although the details are described later with reference to FIG. 21, the detected tilt angle of the LCD 121 exceeding a threshold twice means, for example, that the detected tilt angle of the LCD 121 exceeds the predetermined threshold once and, then, shifts in the opposite direction to cross the threshold and returns to the original range and, subsequently, exceeds the threshold once again. Assume here that the detected tilt angle of the LCD 121 exceeds the predetermined threshold once and the state is then maintained, and the tilt angle exceeding the threshold is repeatedly detected multiple times. This case is not considered as "the detected tilt angle of the LCD 121 exceeding a threshold twice".

In addition, the control unit 201 enables the temporary stop state flag if the state transition button 123 receives a press operation (state transition operation) performed thereon by a user when the display orientation of the display screen 121*a*, detected by the accelerometer sensor 117, is set to be changed according to the tilt direction of the LCD 121 (i.e., when the temporary stop state flag has been disabled and, therefore, a temporary stop state has been released). With this, the control unit 201 enters a temporary stop state in which the display orientation of the display screen 121*a*, detected by the accelerometer sensor 117, is not changed according to the tilt direction of the LCD 121. With this, when not wanting automatic rotation of the display screen 121*a*, a user presses the state transition button 123 to thereby stop the function of automatic rotation.

The display orientation detection unit 102 detects the display orientation of the display screen 121*a* displayed on the LCD 121. For example, the control unit 201 notifies the display orientation detection unit 102 of the display orientation of the LCD 121 according to control of the display orientation of the display screen 121*a* each time the display orientation is automatically changed by the control unit 201 or changed by a user operation or an application. Note that the display orientation detection unit 102 may detect the display orientation of the display screen 121*a* based on the notification by the control unit 201.

The control information storage unit 103 stores control information indicating an orientation of the LCD 121, acquired by the accelerometer sensor 117; a display orientation of the display screen 121*a*, acquired by the display orientation detection unit 102; and a display orientation of the display screen 121*a*, changed by the control unit 201.

The application information storage unit 104 stores application information having rotation resume flags each indicating whether to resume, at the end of a corresponding application, changing the display orientation of the display screen 121*a* by the control unit 201.

The detected tilt information storage unit 205 stores detected tilt information indicating a history of tilt angles detected by the accelerometer sensor 117. The detected tilt information is a history of angles indicating tilt directions detected at a predetermined number of past time points. According to this embodiment, on the basis of the past tilt angles of the information processing apparatus 200, indicated by the detected tilt information, it is determined whether the information processing apparatus 200 enters a temporary stop state and whether the information processing apparatus 200 releases the temporary stop state.

The accelerometer sensor 117 detects the tilt direction of the LCD 121 in relation to the vertical downward direction. The accelerometer sensor 117 detects the tilt direction of the LCD 121 with one degree increments by detecting the direction of gravitational force based on an acceleration applied to the accelerometer sensor 117. Note that, instead of the acceleration, the information processing apparatus 200 may detect a direction of motion using, for example, a gyroscope to thereby detect the tilt direction of the LCD 121. In addition, if the orientation of the LCD 121 is the same as the orientation of the information processing apparatus 200, the accelerometer sensor 117 may detect the tilt direction of the information processing apparatus 200 as the tilt direction of the LCD 121.

The LCD 121 is configured to display the display screen 121*a*, on which information is displayed, in four orientations of "up", "down", "left", and "right". Note however that, instead of the four orientations, the LCD 121 may display the display screen 121*a* in three or less orientations, or five or more orientations. Further, the LCD 121 may display the display screen 121*a* at arbitrary angles instead. In addition, on the display screen 121*a*, textual information and image information, such as a video and a still image, may be displayed.

The screen rotation button 122 receives a display orientation change operation performed thereon by a user, which operation is to change the display orientation of the display screen 121*a*. When a user presses the screen rotation button 122, the display orientation of the display screen 121*a* rotates 90 degrees clockwise.

Here, a user is able to rotate the display orientation of the display screen 121*a* 90 degrees by pressing the screen rotation button 122 once. With this, the user is able to adjust the display screen 121*a* to a desired angle by pressing the screen rotation button 122 multiple times until the display screen 121*a* is set at the desired angle.

The state transition button 123 receives a state transition operation performed thereon by a user, which operation is to make a transition to a temporary stop state in which the display orientation of the display screen 121*a*, detected by the accelerometer sensor 117, is not changed according to the tilt direction of the LCD 121. If a user presses the state transition button 123 when a temporary stop state has been released, a transition is made to a temporary stop state. With this, when not wanting the automatic rotation of the display screen 121*a*, a user presses the state transition button 123 to thereby stop the function of automatic rotation.

FIG. 19 illustrates a detected tilt table according to the third embodiment. A detected tilt table 205*a* illustrated in FIG. 19 is created and managed by the control unit 201, and is stored in the HDD 113 which serves as the detected tilt information storage unit 205. The detected tilt table 205*a* is a table for storing detected tilt information which indicates a history of tilts of the information processing apparatus 200, detected by the accelerometer sensor 117.

The detected tilt table 205*a* contains, in reverse chronological order, newest first, angles which indicate tilt directions of the information processing apparatus 200, detected by the accelerometer sensor 117. The accelerometer sensor 117 acquires the tilt of the information processing apparatus 200 at predetermined time intervals (for example, every 0.1 second). The control unit 201 stores, in the detected tilt table 205*a*, detected tilt information indicating an angle indicating the tilt direction acquired by the accelerometer sensor 117.

The detected tilt table 205*a* includes fields of "number" and "angle". The "number" field indicates the reverse chronological order of detected tilts of the LCD 121. The "angle" field contains angles of detected tilt directions of the LCD 121. The detected tilt information is configured, in which information of individual fields laterally aligned is associated with each other.

In the number field, ascending sequence numbers are assigned to the tilts of the LCD 121 detected by the accelerometer sensor 117 in reverse chronological order, newest first, so that the detected tilt information is listed in time-series order.

In the angle field, each entry indicates an angle of the tilt direction of the LCD 121, detected by the accelerometer sensor 117.

The detected tilt table 205a stores 30 pieces of latest detected tilt information. When the accelerometer sensor 117 detects a new tilt of the LCD 121 and stores this new detected tilt information in the detected tilt table 205a, the oldest detected tilt information having the largest number is deleted, and ascending sequence numbers are reassigned to the remaining and new detected tilt information in reverse chronological order.

Figure 20:
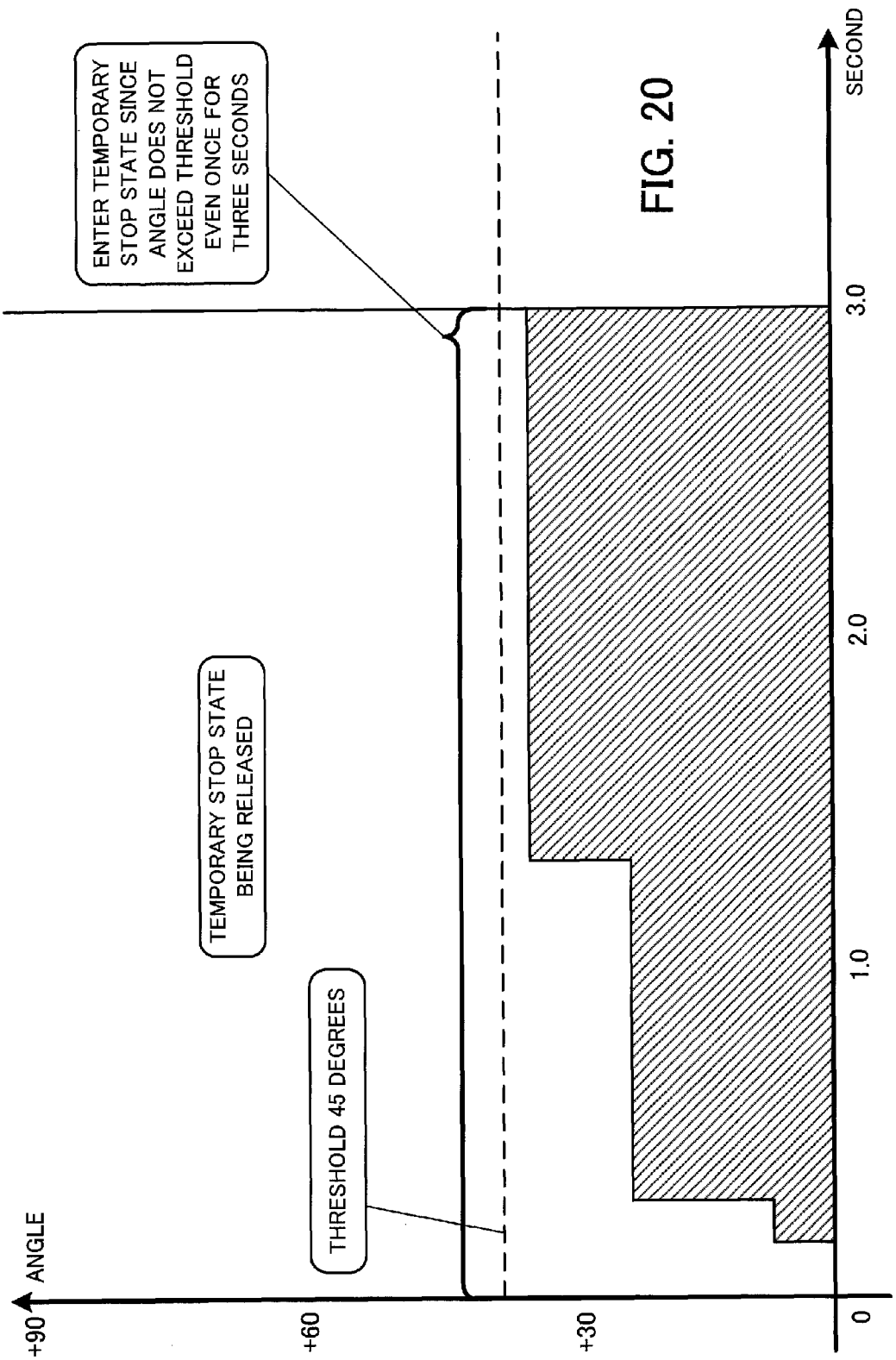
FIG. 20 illustrates a first example of changes in angle of the information processing apparatus according to the third embodiment.

FIG. 20 illustrates a first example of changes in angle of an information processing apparatus according to the third embodiment. In FIG. 20, a vertical axis indicates a tilt angle of the information processing apparatus 200, whereas a horizontal axis indicates a time during which the tilt is applied.

Assume here that the tilt of the information processing apparatus 200 has not been greatly changed for a predetermined period of time (for example, three seconds) or more and the tilt angle of the LCD 121 has not exceeded thresholds (for example, a range of −44 (+316) and +45 degrees). In such a case, it is considered that the information processing apparatus 200 is used with small changes in the tilt of the LCD 121, therefore not requiring much to change the display orientation of the display screen 121a. FIG. 20 illustrates one example of the tilt of the information processing apparatus 200 in such a case. It is assumed that, for simple explanation, changes in the tilt applied to the LCD 121 take place in the direction of a positive angle, however, the same applies to changes in the direction of a negative angle.

Referring to FIG. 20, it is assumed that the information processing apparatus 200 is in a temporary stop released state. In addition, it is assumed that a threshold for automatically rotating the display orientation of the display screen 121a counterclockwise by 90 degrees is 45 degrees. Therefore, to cause automatic rotation of the display screen 121a, the tilt angle of the LCD 121 needs to exceed the threshold of 45 degrees.

Assume here that the tilt applied to the LCD 121 of the information processing apparatus 200, detected from the 0 second point to the 3.0 second point of FIG. 20, does not exceed the threshold of 45 degrees even once. In this case, since the tilt of the LCD 121 does not exceed the above-mentioned threshold of 45 degrees even once within the predetermined period of 3 seconds, the information processing apparatus 200 enters a temporary stop state from the temporary stop released state by a screen display orientation control process, the details of which are described with reference to FIGS. 22 to 24. With this, the information processing apparatus 200 is able to perform control in such a manner as not to cause automatic rotation of the display orientation when the display orientation is not changed for a predetermined period of time.

Figure 21:
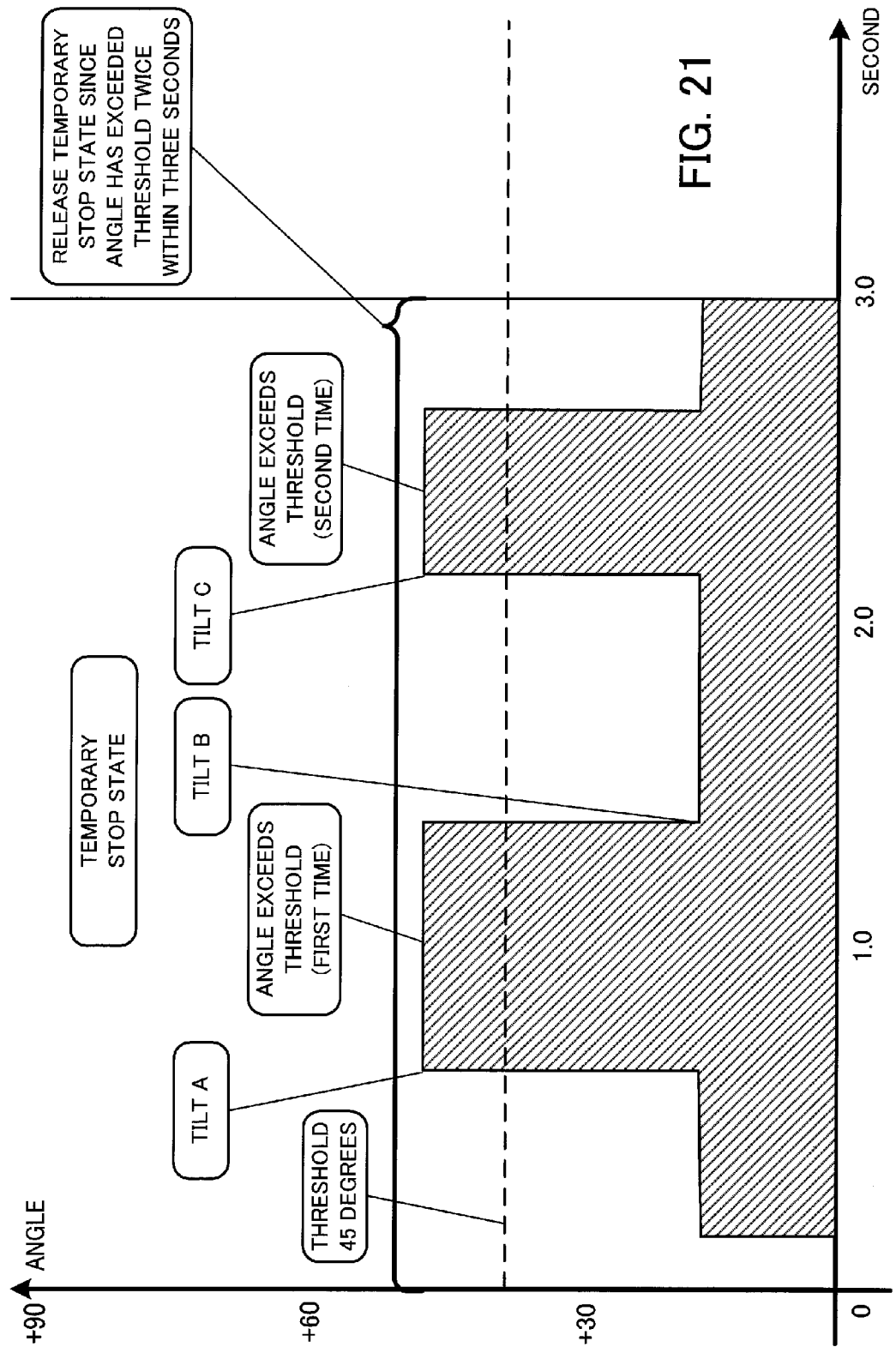
FIG. 21 illustrates a second example of changes in angle of the information processing apparatus according to the third embodiment.

FIG. 21 illustrates a second example of changes in angle of an information processing apparatus according to the third embodiment. In FIG. 21, a vertical axis indicates a tilt angle of the information processing apparatus 200, whereas a horizontal axis indicates a time during which the tilt is applied.

Referring to FIG. 21, it is assumed that the information processing apparatus 200 is in a temporary stop state. In addition, it is assumed that a threshold for automatically rotating the display orientation of the display screen 121a counterclockwise by 90 degrees and a threshold for releasing the temporary stop state are 45 degrees. Therefore, to cause automatic rotation of the display screen 121a, the tilt angle of the LCD needs to exceed the threshold of 45 degrees. In addition, to release the temporary stop state, the tilt angle of the LCD 121 needs to exceed the threshold of 45 degrees twice within three seconds.

Here, the detected tilt angle of the LCD 121 exceeding a threshold twice means, for example, that the detected tilt angle of the LCD 121 ("Tilt A" of FIG. 21) exceeds a predetermined threshold once and, then, shifts in the opposite direction to cross the threshold and returns to the original angle ("Tilt B" of FIG. 21) and, subsequently, exceeds the threshold once again ("Tilt C" of FIG. 21). Assume here that the detected tilt angle of the LCD 121 exceeds the predetermined threshold once and the state is then maintained, and the tilt angle exceeding the threshold is repeatedly detected multiple times. This case is not considered as "the detected tilt angle of the LCD 121 exceeding a threshold twice".

In addition, the beginning and end values of the range according to the tilt of the LCD 121, currently detected by the accelerometer sensor 117, are used as thresholds. For example, when the currently detected tilt of the LCD 121 is 0 degree, the thresholds are −44 (+316) degrees and +45 degrees. In addition, when the currently detected tilt of the LCD 121 is 90 degrees, the thresholds are +46 degrees and +135 degrees. When the currently detected tilt of the LCD 121 is 180 degrees, the thresholds are +136 degrees and −135 (+225) degrees. When the currently detected tilt of the LCD 121 is 270 degrees, the thresholds are −134 (+226) degrees and −45 (+315) degrees.

Assume here that a user wants to cause automatic rotation of the display orientation of the information processing apparatus 200 in a temporary stop state so that the display screen 121a is set in a desired display orientation, and tilts the information processing apparatus 200 45 degrees or more and maintains the tilt from the 0 second point to the 3.0 second point of FIG. 21. In this case, since the information processing apparatus 200 is in a temporary stop state, the automatic rotation desired by the user does not take place.

Assume subsequently that the user once again wants to cause automatic rotation of the display orientation so that the display screen 121a is set in a desired display orientation, and tilts the information processing apparatus 200 45 degrees or more. With this, the automatic rotation desired by the user is allowed to take place from this point forward since the information processing apparatus 200 has released the temporary stop state by the screen display orientation control process, the details of which are described with reference to FIGS. 22 to 24.

Figure 22:
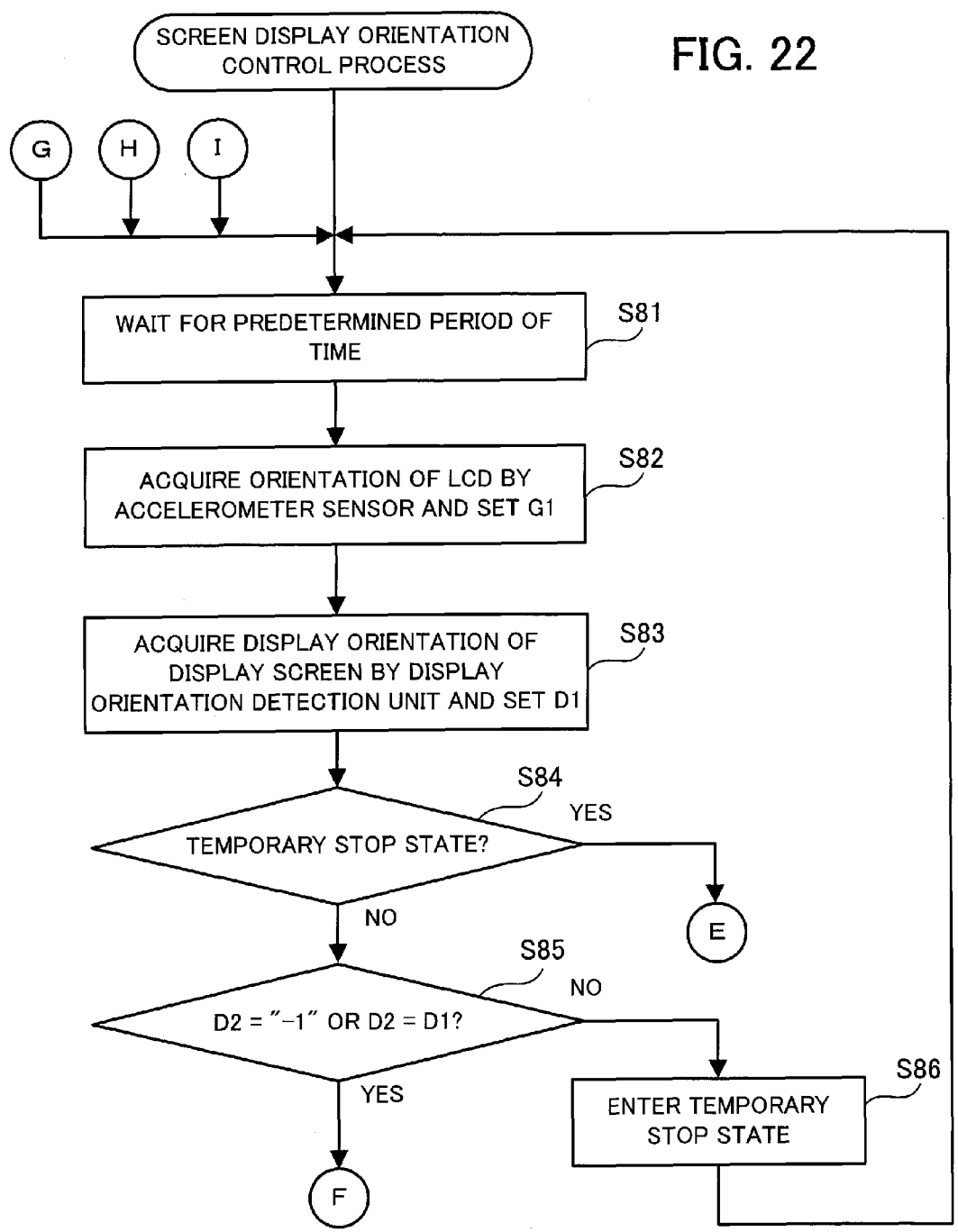
FIG. 22 is a flowchart illustrating a procedure of a screen display orientation control process according to the third embodiment.
Figure 23:
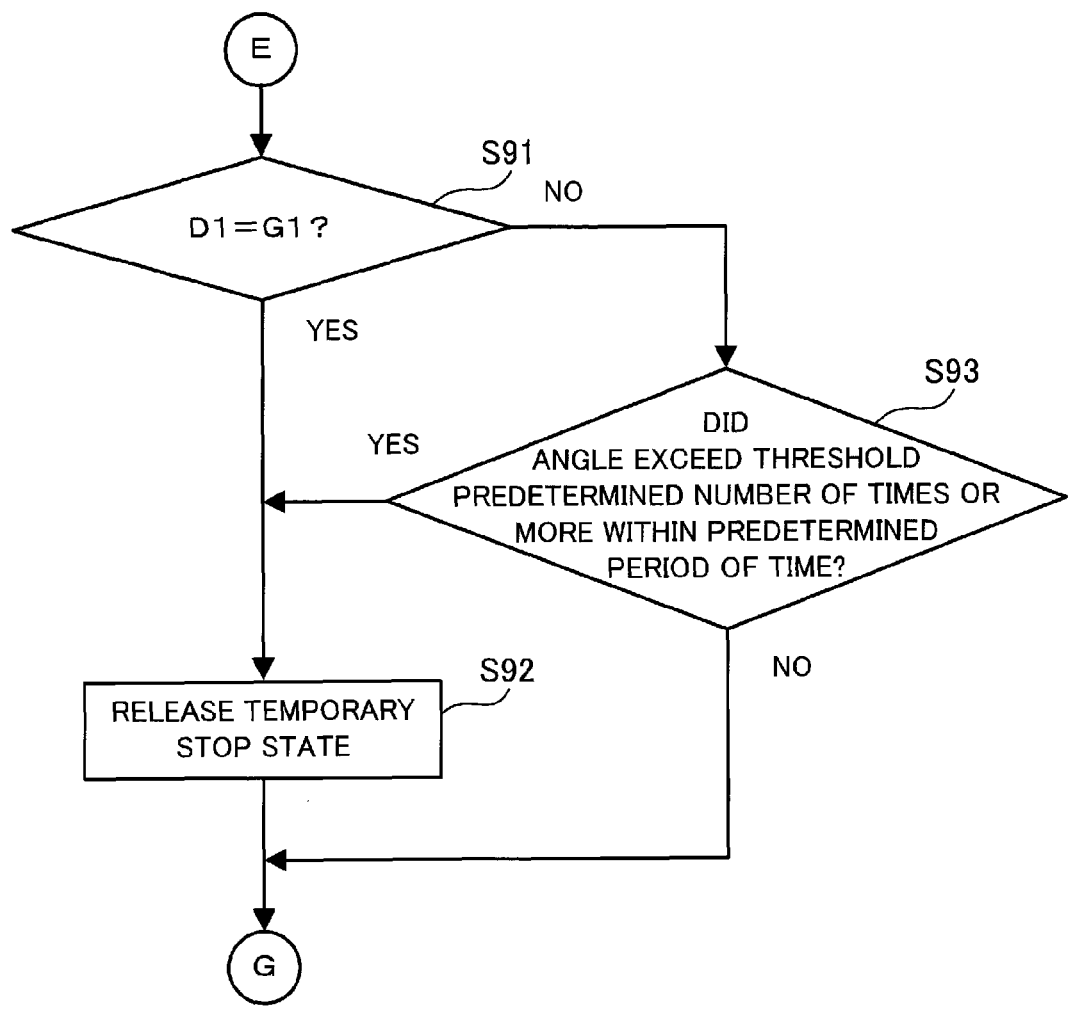
FIG. 23 is a flowchart illustrating the procedure of the screen display orientation control process according to the third embodiment.
Figure 24:
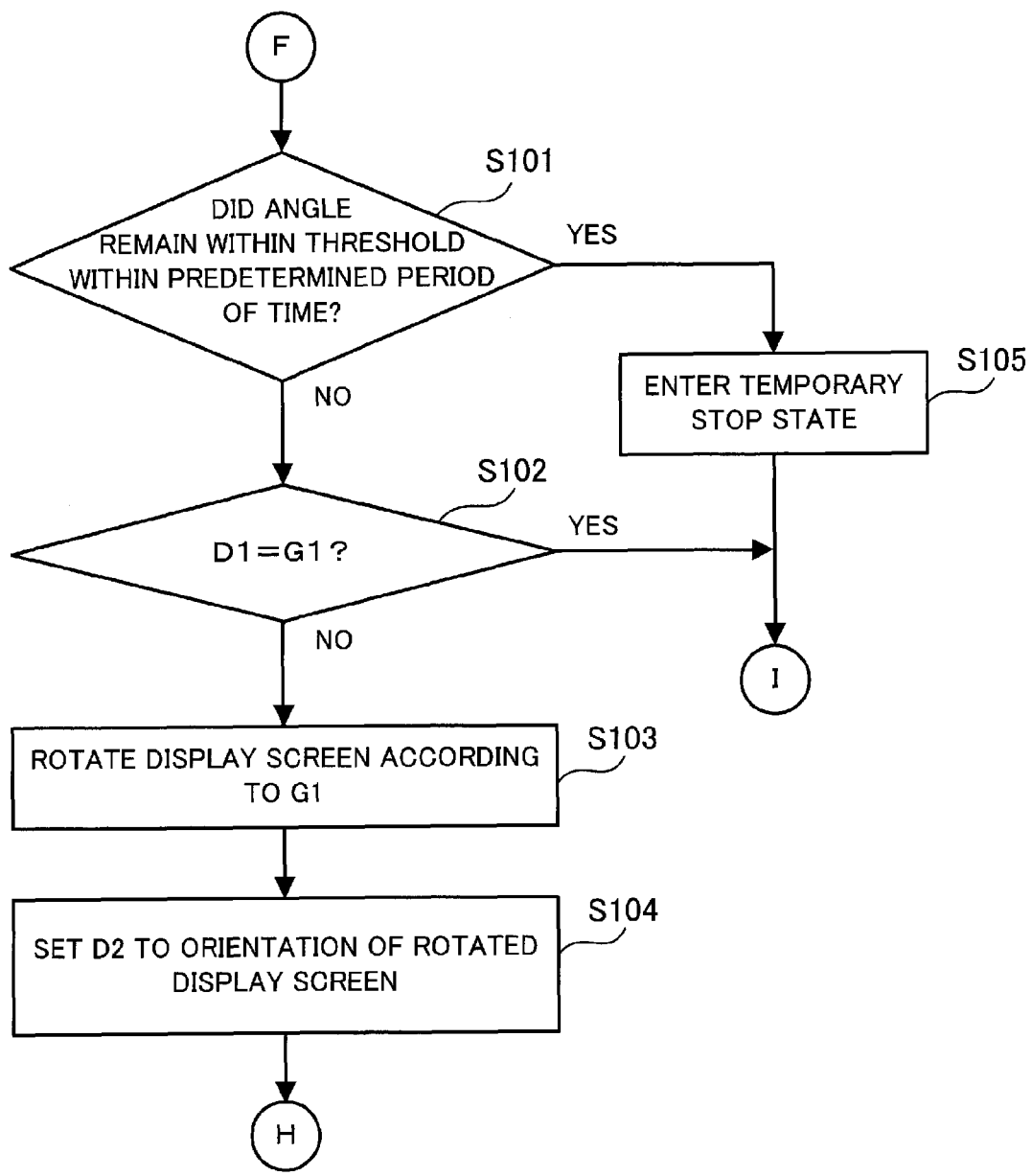
FIG. 24 is a flowchart illustrating the procedure of the screen display orientation control process according to the third embodiment.

FIGS. 22 to 24 are flowcharts illustrating a procedure of a screen display orientation control process according to the third embodiment. By the screen display orientation control process, the information processing apparatus 200 of this embodiment controls the display orientation of the display screen 121a based on the orientation of the LCD 121 of the information processing apparatus 200. In this embodiment, while the display screen 121a is displayed on the LCD 121 by the information processing apparatus 200, the screen display orientation control process is executed. The screen display orientation control process is described next.

[Step S81] The control unit 201 waits for a predetermined period of time (for example, 1 second). With this, an operation of acquiring the orientation of the LCD 121 of the information processing apparatus 200 and acquiring the display orientation of the display screen 121a is performed at constant intervals.

[Step S82] The control unit 201 causes the accelerometer sensor 117 to detect the orientation of the LCD 121 and acquires the detected orientation of the LCD 121. Then, according to the acquired orientation of the LCD 121, the control unit 201 sets G1 indicating the tilt direction of the LCD 121, stored in the control information storage unit 103.

[Step S83] The control unit 201 causes the display orientation detection unit 102 to detect the latest display orientation of the display screen 121a and acquires the detected display orientation of the display screen 121a. Then, according to the acquired orientation of the display screen 121a, the control unit 201 sets D1 indicating the latest display orientation of the display screen 121a, stored in the control information storage unit 103.

[Step S84] The control unit 201 determines whether the information processing apparatus 200 is in a temporary stop state by referring to the temporary stop state flag indicating a temporary stop state or not, stored in the RAM 112. If the information processing apparatus 200 is in a temporary stop state, the control unit 201 proceeds to step S91 (FIG. 23). On the other hand, if the information processing apparatus 200 is not in a temporary stop state, the control unit 201 proceeds to step S85. When the information processing apparatus 200 is in a temporary stop state, the temporary stop state flag is set to a value indicating being enabled (for example, "1"). When the information processing apparatus 200 is not in a temporary stop state, the temporary stop state flag is set to a value indicating being disabled (for example, "0"). In this embodiment, the temporary stop state flag is set to the value indicating being disabled in the initial state. Instead, the temporary stop state flag may be set to the value indicating being enabled in the initial state.

[Step S85] The control unit 201 determines whether at least one of the following is true: D2 indicating the previous latest display orientation is "−1"; and D2 and D1 are equal to each other. At least one of the two is true, the control unit 201 proceeds to step S101 (FIG. 24). On the other hand, neither of the two are true, the control unit 201 proceeds to step S86.

[Step S86] The control unit 201 sets the temporary stop state flag to the value indicating being enabled so that the information processing apparatus 200 enters a temporary stop state.

[Step S91] The control unit 201 determines whether D1 and G1 are equal to each other. If D1 and G1 are equal to each other, the control unit 201 proceeds to step S92. On the other hand, if D1 and G1 are not equal to each other, the control unit 201 proceeds to step S93.

[Step S92] The control unit 201 sets the temporary stop state flag to the value indicating being disabled so that the information processing apparatus 100 releases the temporary stop state. Subsequently, the control unit 201 proceeds to step S81.

[Step S93] The control unit 201 determines whether the detected angle of the LCD 121 exceeds a threshold a predetermined number of times (for example, twice) or more within a predetermined period of time (for example, three seconds). If the detected angle of the LCD 121 exceeds a threshold the predetermined number of times or more, the control unit 201 proceeds to step S92. On the other hand, if the detected angle of the LCD 121 does not exceed the threshold the predetermined number of times, the control unit 201 proceeds to step S81.

[Step S101] The control unit 201 determines whether the detected angle of the LCD 121 does not exceed a threshold even once within a predetermined period of time (for example, three seconds). If the detected angle of the LCD 121 does not exceed the threshold even once, the control unit 201 proceeds to step S105. On the other hand, if the detected angle of the LCD 121 exceeds the threshold at least once, the control unit 201 proceeds to step S102.

[Step S102] The control unit 201 determines whether D1 and G1 are equal to each other. If D1 and G1 are equal to each other, the control unit 201 proceeds to step S81. On the other hand, if D1 and G1 are not equal to each other, the control unit 201 proceeds to step S103.

[Step S103] According to G1 indicating the tilt direction of the LCD 121, the control unit 201 rotates the display screen 121a in such a manner that the downward orientation of the display screen 121a coincides with the vertical downward direction.

At this point, if G1 indicating the tilt direction of the LCD 121 is "0" (the downward orientation of the LCD 121 coincides with the vertical downward direction), the control unit 201 rotates the display screen 121a in such a manner that D1="0" is obtained, that is, the downward orientation of the display screen 121a coincides with the downward orientation of the LCD 121. In addition, if G1 is "90" (the downward orientation of the LCD 121 coincides with the rightward direction to a user facing the LCD 121), the control unit 201 rotates the display screen 121a in such a manner that D1="90" is obtained, that is, the downward orientation of the display screen 121a coincides with the leftward direction of the LCD 121. In addition, if G1 is "180" (the downward orientation of the LCD 121 coincides with the vertical upward direction), the control unit 201 rotates the display screen 121a in such a manner that D1="180" is obtained, that is, the downward orientation of the display screen 121a coincides with the upward direction of the LCD 121. In addition, if G1 is "270" (the downward orientation of the LCD 121 coincides with the leftward direction to a user facing the LCD 121), the control unit 201 rotates the display screen 121a in such a manner that D1="270" is obtained, that is, the downward orientation of the display screen 121a coincides with the rightward direction of the LCD 121.

[Step S104] According to the display orientation of the display screen 121a rotated in step S101, the control unit 201 sets D2 stored in the control information storage unit 103. Subsequently, the control unit 201 proceeds to step S81.

[Step S105] The control unit 201 sets the temporary stop state flag to the value indicating being enabled so that the information processing apparatus 200 enters a temporary stop state. Subsequently, the control unit 201 proceeds to step S81.

According to this embodiment, the accelerometer sensor 117 is provided in the display unit 120 in order to detect the tilt direction of the LCD 121, and the display orientation of the display screen 121a is changed based on the detected tilt direction of the LCD 121. Instead, the accelerometer sensor 117 may be provided in a different part of the information processing apparatus 200, such as the main body unit 130, and the display orientation of the display screen 121a may be changed based on the tilt direction of the information processing apparatus 200.

As described above, according to the third embodiment, the control unit 201 makes a transition to a temporary stop state so as to temporarily stop automatic change of the display orientation in the case where the display orientation of the display screen 121a is different from a display orientation automatically changed based on detection of the orientation of the information processing apparatus 200. With this, when a user or an application changes the display orientation of the display screen 121a, automatic change of the display orientation is not performed and change of the display orientation made by the user, or an application, takes priority. Accordingly, it is possible to adequately control enabling and disabling of the function of automatically changing the display orientation of the display screen 121a.

In addition, when the display orientation of the display screen 121a coincides with the vertical downward direction, the control unit 201 releases the temporary stop state so as to automatically change the display orientation of the display screen 121a. Accordingly, in the case where a user spontaneously rotates the information processing apparatus 200 to make the display orientation of the display screen 121a coincide with the vertical downward direction in order to align the downward orientation of the display screen 121a in the vertical downward direction, it is possible to cancel the priority of the display orientation changed by the user or an application and resume the temporarily stopped automatic change of the display orientation of the display screen 121a.

When the display orientation of the display screen 121a coincides with the vertical downward direction, the control unit 201 releases the temporary stop state so as to automatically change the display orientation of the display screen 121a. Accordingly, in the case where a user wants to intentionally resume automatic change of the display orientation, the LCD 121 of the information processing apparatus 200 is rotated in such a manner that the display orientation of the display screen 121a coincides with the vertical downward direction. As a result, it is possible to cancel the priority of the display orientation changed by the user or an application and resume the temporarily stopped automatic change of the display orientation of the display screen 121a.

In addition, the control unit 201 rotates the display orientation of the display screen 121a 90 degrees clockwise according to a press on the screen rotation button 122 performed by a user. With this, the user is able to change the display orientation of the display screen 121a to a desired angle by repeatedly pressing the screen rotation button 122 until the display angle of the display screen 121a is set at the desired angle.

In addition, the control unit 201 disables the temporary stop state flag at the closing of an application when a corresponding rotation resume flag included in the application information is enabled. With this, even if an application is used which automatically enables the temporary stop state flag in order to stop automatic change of the display orientation of the display screen 121a, it is possible to resume automatic change of the display orientation of the display screen 121a after the closing of the application.

In addition, the control unit 201 disables the temporary stop state flag when the information processing apparatus 200 returns from a power-saving mode, when a transition is made from logoff mode to logon mode, or when a user switch is performed. With this, automatic change of the display orientation of the display screen 121a is resumed in the case where automatic change of the display orientation of the display screen 121a has been temporarily stopped, for example, during application execution, during operation in power-saving mode, during logoff, or during use by another user.

In addition, the control unit 201 makes a transition to a temporary stop state to temporarily stop automatic change of the display orientation in the case where a user operates the state transition button 123 when a temporary stop state has been released. With this, when the user does not want automatic change of the display orientation, automatic change of the display orientation is not performed and change of the display orientation made by the user, or an application, takes priority. Accordingly, it is possible to adequately control enabling and disabling of the function of automatically changing the display orientation of the display screen 121a.

In addition, when the tilt applied to the LCD 121 of the information processing apparatus 200 does not exceed a threshold even once, the control unit 201 makes a transition to a temporary stop state from a temporary stop released state. With this, in the case where there is no change in the display orientation within a predetermined period of time, it is possible to perform control in such a manner as not to cause automatic rotation of the display orientation.

In addition, when a user wants to cause automatic rotation so that the display screen 121a is set in a desired display orientation, and applies tilt exceeding a threshold to the LCD 121 of the information processing apparatus 200 more than once, the control unit 201 releases the temporary stop state of the information processing apparatus 200, which allows the automatic rotation desired by the user to take place. Thus, when a user repeatedly applies tilt to the information processing apparatus 200 with the intention to release a temporary stop state or change the display orientation, the temporary stop state is released so that automatic rotation is performed.

Note that the above-described processing functions may be achieved by a computer. In this case, a program is provided in which processing contents of functions that the information processing apparatus 100 or 200 needs to have are described. By executing the program on the computer, the above-described processing functions are achieved on the computer.

The program in which processing contents are described may be recorded in a computer-readable recording medium. Such computer-readable recording media include a magnetic recording device, an optical disk, a magneto-optical recording medium, and a semiconductor memory. Examples of the magnetic recording device are a hard disk drive (HDD), a flexible disk (FD), and a magnetic tape (MT). Examples of the optical disk are a digital versatile disc (DVD), a digital versatile disc random access memory (DVD-RAM), a compact disc read-only memory (CD-ROM), a CD recordable (CD-R), and a CD rewritable (CD-RW). An example of the magneto-optical recording medium is a magneto-optical disk (MO).

In the case of distributing the above-mentioned program, portable recording media, such as DVDs and CD-ROMs, in which the program is recorded are sold. In addition, the program may be stored in a server computer and then transferred from the server computer to another computer via a network.

A computer for executing the above-mentioned program stores the program, which is originally recorded in a portable recording medium or transferred from the server computer, in its own memory device. Subsequently, the computer reads the program from its own memory device and performs processing according to the program. Note that the computer is able to read the program directly from the portable recording medium and perform processing according to the program. In addition, the computer is able to sequentially perform processing according to a received program each time such a program is transferred from the server computer.

Although the disclosed electronic apparatus, control program, and control method have been described above based on the illustrated embodiments, the structure of each unit may be replaced with an arbitrary structure having a similar function. In addition, other arbitrary components and processes may be added to the disclosed technology. Further, any combination of two or more of the embodiments described herein is considered within the scope of the disclosed technology.

According to the above-disclosed electronic apparatus, control program, and control method, it is possible to control enabling and disabling of the function of automatically changing the display orientation of the display screen.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. An electronic apparatus comprising:
a tilt sensor configured to detect a tilt of a predetermined downward direction of a display, which displays information, from a vertical downward direction; and
a processor configured to perform a procedure including:
acquiring, from the tilt sensor, a detection result of the tilt and detecting a downward direction of a graphic content displayed on a display screen of the display; and
setting a changeable mode where the downward direction of the graphic content is changed according to the detection result of the tilt when the downward direction of the graphic content is detected to coincide with, among orientations in which the graphic content is allowed to be displayed, an orientation closest to the vertical downward direction in a fixed mode where the downward direction of the graphic content is not changed according to the detection result of the tilt.

2. The electronic apparatus according to claim 1, further comprising a memory configured to store control information, wherein:
the procedure further includes:
generating the control information which indicates a downward direction of the graphic content most recently changed according to the detection result of the tilt and storing the generated control information in the memory; and
making a transition to the fixed mode when the detected downward direction of the graphic content does not coincide with the downward direction of the graphic content indicated by the stored control information.

3. The electronic apparatus according to claim 1, wherein the procedure further includes making a transition to the fixed mode when a mode transition operation for making a transition to the fixed mode is received in the changeable mode.

4. The electronic apparatus according to claim 1, wherein the procedure further includes changing the downward direction of the graphic content when a change operation for changing the downward direction of the graphic content is received.

5. The electronic apparatus according to claim 1, further comprising a memory configured to store detected tilt information which indicates a history of angles indicating tilt directions detected by the tilt sensor at a predetermined number of past time points, wherein
the procedure further includes making a transition to the changeable mode when, based on the stored detected tilt information, the angles are determined to have exceeded a predetermined threshold a predetermined number of times or more.

6. The electronic apparatus according to claim 1, further comprising a memory configured to store detected tilt information which indicates a history of angles indicating tilt directions detected by the tilt sensor at a predetermined number of past time points, wherein
the procedure further includes making a transition to the fixed mode when, based on the stored detected tilt information, the angles are determined not to have exceeded a predetermined threshold.

7. The electronic apparatus according to claim 1, further comprising a memory configured to store application information having a rotation resume flag which indicates whether to resume, at closing of a corresponding application, changing the downward direction of the graphic content, wherein
the procedure further includes changing the downward direction of the graphic content according to the detection result of the tilt at the closing of the application when the rotation resume flag of the application information has been enabled.

8. The electronic apparatus according to claim 1, wherein the procedure further includes changing the downward direction of the graphic content according to the detection result of the tilt at time of return from power-saving mode.

9. The electronic apparatus according to claim 1, wherein the procedure further includes changing the downward direction of the graphic content according to the detection result of the tilt when a transition is made from logoff mode to logon mode.

10. The electronic apparatus according to claim 1, wherein the procedure further includes changing the downward direction of the graphic content according to the detection result of the tilt when a user switch is performed.

11. A non-transitory computer-readable storage medium storing a computer program, the computer program causing a computer to perform a procedure comprising:
acquiring a detection result of a tilt of a predetermined downward direction of a display, which displays information, from a vertical downward direction and detecting a downward direction of a graphic content displayed on a display screen of the display; and
setting a changeable mode where the downward direction of the graphic content is changed according to the detection result of the tilt when the downward direction of the graphic content is detected to coincide with, among orientations in which the graphic content is allowed to be displayed, an orientation closest to the vertical downward direction in a fixed mode where the downward direction of the graphic content is not changed according to the detection result of the tilt.

12. A control method comprising:
detecting a tilt of a predetermined downward direction of a display, which displays information, from a vertical downward direction and detecting, by a processor, a downward direction of a graphic content displayed on a display screen of the display; and
setting, by the processor, a changeable mode where the downward direction of the graphic content is changed according to the detection result of the tilt when the downward direction of the graphic content is detected to coincide with, among orientations in which the graphic content is allowed to be displayed, an orientation closest to the vertical downward direction in a fixed mode where the downward direction of the graphic content is not changed according to the detection result of the tilt.

* * * * *